(12) United States Patent
Naumov et al.

(10) Patent No.: US 7,543,494 B2
(45) Date of Patent: Jun. 9, 2009

(54) METHOD FOR DETERMINING THE VERTICAL ON MOVING OBJECTS AND THE DEVICE FOR ITS DETERMINATION

(75) Inventors: Michael Naumov, 10/18 Tar'ad, Ramat Gan (IL) 52503; George Naumov, Ramat Gan (IL)

(73) Assignee: Michael Naumov, Tel Aviv (IL)

( * ) Notice: Subject to any disclaimer, the term of this patent is extended or adjusted under 35 U.S.C. 154(b) by 0 days.

(21) Appl. No.: 11/438,145

(22) Filed: May 22, 2006

(65) Prior Publication Data

US 2007/0245820 A1    Oct. 25, 2007

(51) Int. Cl.
*G01C 21/00* (2006.01)
(52) U.S. Cl. ..................................... 73/178 R
(58) Field of Classification Search ............ 73/179, 73/170.02
See application file for complete search history.

(56) References Cited

U.S. PATENT DOCUMENTS 4,043,526 A * 8/1977 Donley et al. ............... 244/194

* cited by examiner

*Primary Examiner*—Andre J Allen

(57) ABSTRACT

The technical solution provided of determining the vertical on the moving object is based on bringing the difference of apparent and horizontal accelerations to zero. It enables one to solve the tasks of determining the parameters of movement with the threshold of sensitivity equal to zero with efficiency and accuracy, and in small-size version (compactness). This solution can be used without any gyroscopes, and be implemented irrespective of disturbance factors influence, in particular, transverse and centrifugal accelerations, vibrations, temperatures and others.

18 Claims, 11 Drawing Sheets

METHOD FOR DETERMINING THE VERTICAL ON MOVING OBJECTS AND THE DEVICE FOR ITS DETERMINATION

FIELD OF ART

The technical solution concerns the non-disturbance accurate determination of the gravitational vertical on the moving object, particularly, in the navigational, piloted, marine systems and devices, in the stabilization systems of various devices to be located on the moving objects (aerials, weapons, photo cameras, etc.) in the building machinery, while conducting ordnance—survey maps and the like.

BACKGROUND OF THE INVENTION

Under the vertical to be determined (by this technical solution) we will mean the gravitational vertical being the direction wherein the plummet (pendulum) would be located (positioned) only under the influence of the field of gravitation of the Earth (virtually, it being in non-rotating state).

At present, on the vehicles two methods are mainly used for determining the vertical: radial and inertial [1].

In both methods use is made of the gyroscope or stabilization platform, the gyro scopes being located whereon. Herewith, the signals are sent on the said gyroscope or the said platform in the form of the moments making them precession (rotate) at an angular speed of the rotation of the vertical of the place of location. The main difference of the said methods is in the method of forming the signals mentioned.

In the radial method the said signals are given off by the pendulum devices (or accelerometers), and in the inertial method use is made of the signals integrals of the said accelerometers.

The pendulum device (like an accelerometer) is considered to be subjected to harmful influence of the mutually perpendicular components $a_\eta$, $a_\xi$, $a_\zeta$ of the absolute acceleration vector. Therefore, the radial method is used only for piloting but not for the navigation purposes. The vertical component $a_\eta$ is directed along the vertical $\eta$, and the components $a_\xi$ and $a_\zeta$ are located in the horizontal plane and are acting along the horizontal axes $\xi$ and $\zeta$.

Let's assume that the component $a_\eta$ will be called the vertical acceleration, and the horizontal component $a_\zeta$—longitudinal acceleration, and the horizontal component $a_\zeta$—lateral acceleration, correspondingly.

In the inertial method, with the Shuler's non-disturbance condition observed, any harmful influence of the horizontal progressive acceleration is eliminated. This method is used not only for piloting but also for the navigation purposes. The inertial method is implemented in the gyro stabilization platform (GSP), wherein the said platform is stabilized in the horizontal position (in the horizontal plane). In the gyro stabilization platform (GSP) stabilization is performed along two channels (concerning two axes), even in those cases when it is not required. For example, when the stabilization in one channel (particularly, regarding longitudinal or cross-section axis of the moving object) is performed with the help of some additional means (using the skyline, movement along radio glissade, etc.).

This application relates mainly to the solution of the one-channel determination of the vertical, on the base whereof there will be provided, in brief, the two-channel device for the vertical determination, comprising a suspension with the platform stabilized in the horizontal position.

The main units of the GSP of one (from the two) channel are considered to be a gyroscope (gyroscopes), an accelerometer, erection mechanism (positioned on the platform) and an integrator (integrators) connected to each other.

The gyroscopic platform (GSP) is considered to have significant drawbacks:

long-lasting initial orientation (for more precise orientation tens of minutes are required);

for making the GSP, the gyroscopes, in particular, so strict requirements are to be met in terms of accuracy that in industry the said requirements cannot often be met;

the noticeable dependence of the accuracy of operation on the vertical centripetal and Coriolis accelerations as well as other disturbing factors (vibrations, temperature changes and others);

the necessity of fulfilling the Shuler's non-disturbance condition which is sure only for a certain flight altitude and is considered to exclude the opportunity of the quality improvement of adjustment (stability) through internal means (the signals of other sources are required);

with the negative vertical acceleration the signals of accelerometers can be, while tilting, (and the latter is said to practically always occur) intolerably big and, moreover, can cause considerable avalanche-like deflection of the platform from the horizontal position;

considerable complexity, weight, unhandiness, cost;

determination is made of not the gravitational vertical caused by the gravitational force but the vertical caused by the gravity force.

The closest analogue (prototype) of the technical solution to be provided is the device [2] to have been formerly proposed and patented by the authors. The said prototype in one channel comprises, as it is stated from its claims, the tilting angular sensor, the linear acceleration determiner positioned on the stabilization platform, the treatment unit and the unit of adjusting the platform into horizontal position. This adjustment unit receiving the signals from the said sensor and the said determiner is said to turn the said platform till superimposing their output signals. The present prototype has for its object to remove the above drawbacks of the GSP, however, only with the positive vertical acceleration $a_\eta$ (the vertical component of the absolute acceleration vector). Besides, like in the GSP, in the said prototype no harmful influence (on the operation accuracy) of the vibrations is prevented to the right degree. The negative vertical acceleration is considered to affect the said prototype in the same harmful way as it does on the said GSP. Therefore, with the negative vertical acceleration the application of the said prototype (as well as the GSP) might become impossible.

Meanwhile, the cases of the negative vertical acceleration ($a_\eta < 0$) do occur in practice, particularly, with the vibrations (the ones when there are even cases $|a_\eta| \gg g$, where g—free falling acceleration), with moving down towards the Earth (for example, rockets, spacecrafts) with $|a_\eta| > g$, in "the air pockets".

In addition, with the turned-down position (for example, of an aircraft) applying the prior art for determining the vertical is said to be possible only through performing special commutation (for example, the one to be used in the gyro horizon), which is also the disadvantage of the said solutions, particularly, herewith non-interruption of the readings being avoided.

In addition, the claims of the prototype [2] are considered to be wrong by definition. It is accounted for the fact that in the said claims use is made of the determiner of allegedly "linear acceleration". But it is well-known that by definition the linear acceleration is directed at a tangent to the trajectory of the movement. And the said determiner is said to react particularly, on the centripetal acceleration as well, and, however, due to that, it doesn't determine the linear acceleration. Therefore, the prototype [2] cannot be opposed to (compared to) the prior art and for the same reason, the technical solution to be provided.

The present technical solution comprehends determining the gravitational vertical, increasing the accuracy and broadening the field of art, particularly, with acting of both positive and negative vertical acceleration; simplifying, lessening the weight, reducing the cost and lessening the construction sizes (more compact). Therefore, the said solution is considered to be universal.

SUMMARY OF THE INVENTION

The purpose mentioned in one of the two channels, at least, (on one of the two axes) is achieved:

by determining the apparent acceleration ($a_{\kappa\xi}$, in particular) in the plane chosen, passing through the mutually perpendicular axes of the platform, whereon there are determined accelerations, one of the axes being vertical, and another—chosen, for example, being parallel to the longitudinal axis of the moving object, particularly, superimposed with that longitudinal axis, by determining one of the accelerations in the said plane, for example, the horizontal acceleration $a_\xi$, being the part of the said apparent acceleration $a_{\kappa\xi}$, by determining the difference of the said accelerations (in particular, $a_{\kappa\xi} - a_\xi$), by changing polarities of the said accelerations in the case of the polarity change of another acceleration, particularly, of the vertical one $a_\eta$, also being the part of the said apparent acceleration (particularly, $a_{\kappa\xi}$);

by determining the gravitational vertical in terms of the said difference, particularly, through bringing the said difference up to zero (by turning the said platform).

When applying the platform the vertical is determined according to its position in the horizontal plane.

The apparent acceleration is determined by the accelerometer by its sensitivity axis. The apparent acceleration contains projections on this axis of the absolute acceleration vector components $a_\xi$, $a_\eta$, $a_\zeta$. Herewith, the two positions of the said sensitivity axis are possible. For determining $a_\xi$ the sensitivity axis occupies, in general case, the position close to the horizontal, and for determining $a_\eta$—close to the vertical, correspondingly. The word "close" is used because, in general case, an ideal superposition of the said sensitivity axis with the horizontal or vertical is considered to be practically impossible. Herewith, it is customary to have any harmful influence of the lateral acceleration $a_\zeta$ eliminated, constructively, since the projection of the said acceleration (this component) on the sensitivity axis of the accelerometer is said to be equal to zero.

Therefore, in general case, it would hold for the following dependences:

$$a_{\kappa\xi} = a_\xi \cos \nu - a_\eta \sin \nu, \qquad (1)$$

$$a_{\kappa\xi} = a_\xi \cos \nu - a_\xi \sin \nu, \qquad (2)$$

$$a_{\kappa\zeta} = a_\zeta \cos \nu_\zeta - a_\eta \sin \nu_\zeta, \quad a_{\kappa\eta} = a_\eta \cos \nu - a_\zeta \sin \nu_\zeta \qquad (2a)$$

where $\nu$—the angle of non-horizontality of the said platform at the axis chosen in the horizontal plane (particularly, the horizontal axis $\xi$), i.e. the angle of its tilting in relation to the said axis, $\nu_\zeta$—the angle of non-horizontality of the said platform in relation to the axis $\zeta$, $a_{\kappa\xi}$, $a_{\kappa\zeta}$—apparent accelerations with the said sensitivity axis being in the position close to the horizontal one, at the axes $\xi$ and $\zeta$, correspondingly;

$a_{\kappa\eta}$—apparent acceleration with the said sensitivity axis being in the position close to the vertical.

From (1), (2), (2a) it is seen that the apparent acceleration comprises two accelerations:

the horizontal $a_\xi$ (or $a_\zeta$) and the vertical $a_\eta$.

With small values of $\nu$ and $\nu_\zeta$ (when with higher accuracy $\cos \nu = 1$, $\sin \nu = \nu$, $\cos \nu_\zeta = 1$, $\sin \nu_\zeta = \nu_\zeta$ can be considered) the dependences (1), (2), (2a) look like $$a_{\kappa\xi} = a_\xi - a_\eta \nu, \qquad (3)$$

$$a_{\kappa\eta} = a_\eta - a_\xi \nu, \qquad (4)$$

$$a_{\kappa\zeta} = a_\zeta - a_\eta \nu_\zeta, \quad a_{\kappa\eta} = a_\eta - a_\zeta \nu_\zeta \qquad (4a)$$

In its turn, the sensors of the horizontal [3], [4] and vertical [5], [6] accelerations are considered to determine the components $a_\xi$, $a_\eta$, $a_\zeta$ of the vector of the absolute acceleration, correspondingly.

As a consequence, the corresponding differences ($\Delta a_\xi$ or $\Delta a_\eta$ or $\Delta a_\zeta$) of the said accelerations (the apparent ones and the components of the vector of the absolute acceleration) are determined by the dependences:

$$\Delta a_{\kappa\xi} = a_{\kappa\xi} - a_\xi = -a_\eta \nu \qquad (5)$$

$$\Delta a_\eta = a_{\kappa\eta} - a_\eta = -a_\xi \nu \qquad (6)$$

$$\Delta a \zeta = a_{\kappa\zeta} - a_\zeta = -a_\eta \nu_\zeta, \quad \Delta a_\eta = a_\eta - a_\zeta \nu_\zeta - a_\eta = -a_\zeta \nu_\zeta \qquad (6a)$$

The accelerations $a_\xi$, $a_\zeta$, $a_\eta$ are determined by the known sensors [3], [4], [5], [6] and therefore, they can be considered known. Knowing these accelerations ($a_\eta$ or $a_\xi$ or $a_\zeta$) and $a_\eta \nu$ or $a_\xi \nu$ ($a_\zeta \nu$) it is possible to determine the angles $\nu$ and $\nu_\zeta$ $$\left( \nu = \frac{a_\eta \nu}{a_\eta}, \quad \nu_\zeta = \frac{a_\eta \nu_\zeta}{a_\eta}, \quad \nu = \frac{a_\zeta \nu}{a_\zeta}, \quad \nu_\zeta = \frac{a_\zeta \nu_\zeta}{a_\zeta} \right),$$

as well as the vertical, consequently.

Besides, the vertical can be determined according to the position of the said platform, which is driven by the actuating mechanisms (at two axes $\xi$ and $\zeta$), thereon there are supplied the corresponding signals (particularly, the signals $a_\xi \nu$ and $a_\zeta \nu_\zeta$) into the horizontal position which corresponds to the values $\nu = 0$, $\nu_\zeta = 0$, where $\nu$ and $\nu_\zeta$ are the angles of non-horizontality in relation to the axes $\xi$ and $\zeta$, correspondingly.

In particular, from (3) and (4) it is seen that with changing the polarities (of the sign with the direct current or the phase with the alternating current), $a_\eta$ or $a_\xi$, correspondingly, the polarity of the signal supplied to the actuating mechanism is expected to change as well, and the adjustment of the said platform will occur in the opposite (to the one required) direction. Therefore, in this case, for providing the right direction of the platform tilting provision is made for the automatically stipulated polarities change. Thus, in the case of the sensitivity axis position in the way close to the horizontal, and with negative vertical acceleration being present as well, provision is particularly made for the change of the signals polarities $a_{\kappa\xi}$ and $a_\xi$. Similarly, in the case of positioning the sensitivity axis in the position close to the vertical, and changing the polarity $a_\xi$ as well, provision is made for the polarities change $a_{\kappa\eta}$ and $a_\eta$, in particular.

Determining the apparent acceleration, the horizontal (the horizontal being $a_\xi$ or $a_\zeta$) as well as the vertical accelerations is performed in the plane of their determining, the latter passing through the vertical axis of the platform, particularly, through the straight line parallel to the axis mentioned.

Under the vertical axis of the platform we will mean such an axis thereof that is either superposed with the vertical or is deviated from it at such small angles ($\nu$ or/and $\nu_\zeta$) that for them it is possible to consider $\cos \nu = 1$, $\sin \nu = \nu$, $\cos \nu_\zeta = 1$, $\sin \nu_\zeta = \nu_\zeta$ with fairly high accuracy.

The horizontal axes $\xi$ (longitudinal) and $\zeta$ (lateral) are used in the planes passing through the vertical axis of the platform. Herewith, the axis $\xi$ is used, by way of example, in the plane passing through the longitudinal axis of the platform (in particular, parallel to the longitudinal axis of the moving object, whereon the said platform is positioned or superposed therewith), and the horizontal lateral axis $\zeta$, by way of example), —in the plane passing through the lateral (cross section) axis of the said platform.

Determining the accelerations difference $\Delta a_\xi$ or $\Delta a_\eta$ or $\Delta a_\zeta$, expressed by the dependence (3), or (4), or (4a) is performed in terms of the difference of the pressures of the flowing medium occurring only with the said platform tilting ($\nu \neq 0$ or (and) $\nu_\zeta \neq 0$), (whereon determination of the accelerations is made) irrespective of the directions of the accelerations and their values.

In the present application, by way of example, and for the purpose of simplifying the procedure of consideration, further there is presented the case of locating the said sensitivity axis close to the horizontal the axis $\xi$, in particular.

Determining (with the permissible platform tilting in the working position) the longitudinal acceleration $a_\xi$ is performed, irrespective of the direction and the value of the vertical acceleration, at pressures differences to be determined in the points, wherein the pressures created by the cross section accelerations (vertical $a_\eta$ and transverse $a_\zeta$) are equal, and the ones created by the longitudinal acceleration $a_\xi$ are different.

Determining (with the permissible platform tilting in the working position) the vertical acceleration is performed, irrespective of the directions and values of the cross section accelerations, in terms of the pressures differences, to be determined in the points, wherein the pressures created by the cross-section accelerations (in this case, the accelerations acting in the horizontal plane) are equal, and the ones created by the vertical acceleration $a_\eta$ are different.

According to the invention, the method for determining the vertical is implemented in a one-channel (OChVDD) and two-channel (TChVDD) devices for determining the gravitational vertical.

In the two-channel device (TChVDD) determining the gravitational vertical is implemented through adjusting the frames of the gimbal suspension in the horizontal position by means of the one-channel devices for determining the gravitational vertical, located at the axes of the said suspension.

The plane, wherein determining the accelerations (the apparent and horizontal ones) is performed, will be called the plane for determining the accelerations (particularly, the plane of determination). This plane is chosen passing through the mutually perpendicular axes of the platform mentioned, one of which is the vertical axis (in particular, the said plane chosen passing through the lines of the said platform, the lines being parallel to the said axes). Another axis of this kind is chosen, particularly, to be the line on the moving object parallel to the longitudinal or transverse axis of this object (or superposed with any of the said axes).

The apparent acceleration $a_{\kappa_\xi}$ is itself the projection (in the plane of determining accelerations) of the vector of the absolute acceleration on the sensitivity axis of the accelerometer (also located in the said plane).

The horizontal acceleration ($a_\xi$ or $a_\zeta$) is by itself the projection (in the plane of determining accelerations) of the said vector onto the horizontal plane.

The vertical acceleration $a_\eta$ is itself the projection of the said vector onto the vertical.

The one-channel device for determining the gravitational vertical (OChVDD) is said to consist of the bipolar determiner of accelerations differences (the apparent and horizontal) and the actuating mechanism mutually connected, at the input whereof the signal of the said determiner (BDAD) is supplied. The determiner of the said difference is called bipolar since unlike the prototype [2], it is considered to determine the said difference of the right polarity not only with the positive but also with the negative vertical acceleration.

According to the present application there are provided two embodiments of the said bipolar determiner of the accelerations differences (BDAD):

the first embodiment wherein use is made only of the devices to have been invented by the authors considered to be based on the usage of the pressure sensors for determining pressure in special points;

the second embodiment wherein alongside with the devices invented by the authors for determining the vertical $a_\eta$ and horizontal accelerations (in particular, by way of example, —longitudinal acceleration $a_\xi$) the known accelerometer is also used.

Herewith, both in the first and in the second embodiment each (joint) pair of the pressure sensors is said to have either two sensing elements (each pressure sensor having a sensing element) or each (joint) pair of the pressure sensors having one common sensing element, (for example, elastic diaphragm, a membrane, in particular).

Every embodiment comprises inner cavities of the miniature vessels (a vessel) filled with the flowing medium (liquid, gas or their mixture), provided with the pressure sensors. The vessels (a vessel) are rigorously fastened on the platform which is held by the actuating mechanisms, in particular, by one mechanism of that kind, in the horizontal position (in the horizontal plane). The platform can be fastened either on the shaft of the actuating mechanism or be like the frame of the suspension (gyroscopic or non-gyroscopic) or be like the body of the moving object. When using an accelerometer, it is also rigorously fastened on the platform mentioned.

Herewith, use is made of the sensitivity axes to be located in one plane (the determination plane) or in the parallel planes, along the said axes the determination is performed of the horizontal (as an example, in particular, the longitudinal one), the vertical as well as the apparent accelerations.

The contour of the inner cavity cross section (wherein the pressure is determined) of each vessel has been chosen to be located in one of the parallel acceleration determination planes (particularly, in the superposed plane), in the middle of the said plane, in particular.

Every embodiment comprises the determining differential block (differential scheme), from the output whereof there is provided the signal into the actuating mechanism. The differential blocks used in the present inventions can be put in any appropriate place of the moving object and can constructively be concentrated in one body. As each differential block used can be applied an electrical bridge, a magnet amplifier using the differential scheme, an electrical differential scheme of the electrical parameters (voltages, currents, resistances, capacities, inductances).

The actuating mechanism is connected with the vessels (and when applying the accelerometer, with the latter as well) directly (the platform, whereon they are rigorously fastened, is fastened on its shaft), or by means of the units driving the moving object, or by means of the gyroscope, or some gyroscopic platform.

The actuating mechanism (its body, in particular) is fastened either on the body of the moving object or on the suspension frame (or on its axis). As the actuating mechanism use is made of an electrical mechanism (an electrical motor, including the one with the built-in reducer, a motor-generator, an electromagnet), a robot pilot or a pilot, and in the case of applying the gyroscope (or the gyro-stabilized platform, correspondingly)—an erection motor working in the delayed mode.

At first, in the present application consideration will be given to the $1^{st}$ embodiment of the BDAD and then the $2^{nd}$ embodiment of the BDAD as well.

The first embodiment of the BDAD, in particular, consists of two pairs of the sealed, rigorously interconnected (fastened on the platform held in the horizontal position, particularly, by the actuating mechanisms), predominantly similar vessels, filled with the flowing medium (liquid, gas, liquid with gas bubbles), of an even number of the pairs (the two, in particular) of the vessels-connected pressure sensors, the outputs whereof are switched to the differential blocks called measuring (measuring differential schemes).

In each of the above said contours of one joint pair of the vessels the authors used, unlike the prior art, the lower point remaining as such (the lower) within the permissible platform tilting in the working position. This joint pair of the vessels with the measuring differential block, its two pressure sensors are switched whereto, may be assumingly called the lower pickup. This pickup at $a_n>0$ is considered to determine the apparent acceleration $a_{\kappa_\xi}$ (i.e. works in the accelerometer operating mode), and at $a_n<0$ is considered to determine the horizontal acceleration, particularly, $a_{\kappa_\xi}$ (i.e. works in the horizontal acceleration determination device mode).

In each of the above mentioned contours of another joint pair of the vessels the authors used the upper point remaining as such (the upper) within the permissible platform tilting in the working position. This said second joint pair of the vessels with the measuring differential block, its two pressure sensors are switched whereto, may conventionally be called the upper pickup. The said pickup at $a_n>0$ is said to determine the horizontal acceleration, $a_\xi$, in particular, (i.e. works in the horizontal acceleration determination device mode), and at $a_n<0$ is said to determine the apparent acceleration, $a_{\kappa_\xi}$ (i.e. works in the accelerometer mode).

It should be kept in mind that $a_n=0$ occurs under the state of weightlessness, and in the stationary position and with the horizontal movement $a_n=g$.

The signals from the outputs of the measuring differential blocks (the signals of both pickups mentioned) are supplied to the determining differential block, from the output whereof there is taken the signal $a_n \sin v$ ($v$—the angle of the non-horizontality, i.e. the platform tilting angle, whereon there are fastened the vessels relative to the horizontal plane). Since the angle $v$ is rather small (fractions of an arch second), then with considerably higher accuracy it may be assumed that $a_n \sin v \approx a_n v$. Receiving the signal $a_n \sin v \approx a_n v$ the actuating mechanism is considered to bring the angle $v$ up to zero, therewith, holding the platform (with the vessels) in combination with the other actuating mechanism (the latter acting along other perpendicular axis, particularly, the axis ζ) in the horizontal position irrespective of the sign of the vertical acceleration.

In each of the pickups (in each joint pair of the vessels) determining of pressure is performed in special points. These points are chosen to be located similarly in the inner cavities of each joint pair of the vessels. This means that with assumed congruent moving of the inner cavity of one vessel of each joint pair (of the vessels) in relation to the similar cavity of another vessel of the said joint pair till their superposition, which is possible due to the similarity of the inner cavities of the vessels (vessel), these said points are also superposed.

Alongside with that, these points are chosen similarly located on the parallel straight lines belonging to the said contours (particularly, on the superposed straight line) in the plane of determination (determination planes). In one pair of the inner cavities of the vessels (in the lower pickup) the said parallel straight lines are said to pass through the lower points (the lines containing the said lower points). In this pair the points of pressure determination are located at the similar distances from the lower points. In another pair of the inner cavity (in the upper pickup) the said parallel straight lines are said to pass through the upper points (the lines containing the said upper points). In this pair the points of pressure determination are located at the similar distances from the upper points.

Such location of the pressure determination points and the application of the differential schemes (differential blocks) are said to prevent any harmful influence of the vertical accelerations (both positive and negative) as well as lateral (traverse), i.e. oriented perpendicularly to the planes (plane) of determining the accelerations. Moreover, the signal of the vertical acceleration ($a_n \sin v \approx a_n v$) is used as useful for stabilizing the platform (the vessels fastened whereon) in the horizontal position (in the horizontal plane). Herewith, the higher the value $a_n$, the more accurate the stabilization is expected to take place. Due to this reason, the vibrations are said to contribute to the accuracy increase of the said platform stabilization.

For preventing errors caused by the parameters spread of the pressure sensors of each joint pair of the vessels, the lateral wall common for the latter is used by the authors, the one of the vessels inner cavities, containing the upper or lower point as well, in particular, the elastic diaphragm, for example, a membrane (metallic or dielectric). This means that the pressure sensors of each joint pair of the vessels in this case are said to have one common sensing element (diaphragm). Herewith, use can be made of the change of different parameters caused by the deflection of the sensing element under the influence of the pressures in the said vessels. In particular, there are chosen the changes of the electrical capacities caused by the changes of the distances of the said diaphragm from the walls of the vessels inner cavities. The said changes are said to occur due to the diaphragm deflection under the influence of the pressures caused be the horizontal accelerations present (to be more exact, horizontal inertia forces). Herewith, there are artificially created two capacitors. As the electrodes of the said capacitors use is made of the said diaphragm being the common electrode for both capacitors, and the vessels walls to be located on either side thereof. The said electrodes are considered to be electrically insulated from each other, for example, by insulating lacquer coating. In particular, the vessels walls are chosen to be made from the insulating material (it being electrical), whereon there are partly applied metallic coatings. Each of these coatings in this case is considered to be one of the electrodes. Another, common for both artificially created capacitors is said, in this case, to be a metallic diaphragm. Use can be made of another embodiment: the vessels walls and the said diaphragm are metallic, they being insulated (electrically) from each other.

With the diaphragm deflecting (in the presence of the horizontal acceleration) on one side of the former the capacitance increases and on the other side it decreases, correspondingly. The difference of the said resistances is said to be proportional to the horizontal acceleration. For determining the horizontal acceleration the said artificially created capacitors are switched to the measuring differential block, from the output whereof the signal of the said acceleration is taken.

The contour of the cross-section of the inner cavity of each vessel in the determination plane is made asymmetrical in relation to the straight line (belonging to the said contour), passing in each contour of one pair of the vessels (in the lower pickup) through the said lower point (containing this very point), and in each contour of another pair of the vessels (in the upper pickup) passing through the upper point (containing the said point).

In the device for determining the horizontal acceleration when applying the common wall for the said pair of the inner cavities of the vessels the above mentioned asymmetry is performed in relation to the said wall, it passing through the said upper and lower points (containing the said points).

In the device for determining the vertical acceleration when applying the common wall for the said pair of the inner cavities of the vessels the above mentioned asymmetry is performed in relation to the said wall, it passing through the extreme points horizontally (containing the said points).

The above mentioned lower, upper and extreme points are considered to be the outermost.

At the same time, the contours of the inner cavities of each joint pair of the vessels are said to be counter-oriented. Such counter-orientation means that the extreme, namely, the outermost horizontally counter points in each joint pair of the said vessels are positioned on either sides from the said parallel straight lines (particularly, in relation to the superposed straight line, i.e. in relation to the said common wall of the joint pair of the inner cavities of the vessels).

The above mentioned asymmetry of the inner cavity of each vessel and counter-orientation of the said contours of each joint pair of the vessels make the said contours non-congruent (with their assumed parallel transfer, they don't superpose), which enable it to determine the accelerations required (apparent and horizontal).

All the contours mentioned in the present application are said to be located in the plane passing through the mutually perpendicular axes of the moving object, one of which being the vertical axis, and another one—chosen, in particular, longitudinal or transverse axis of the said object.

The authors' investigations show that in each corresponding (joint) pair of the said contours there is the only one being the most optimal pair of the points for determining pressure, it being located on the parallel lines. The authors' investigations also show that there exists the most optimal position of the common wall (namely, the diaphragm) to be used for the said joint pair of the inner cavities of the said vessels.

From these investigations it appears that owing to the counter-orientation, the most optimal selection of the position of the wall (namely, the diaphragm) and the vessels shape, the signals of the horizontal accelerations in the permissible tilting range are practically independent from the changes of the lengths of the horizontal columns of the flowing medium acting on the pressure sensors.

For applying, while determining the vertical, any known accelerometer, provision is made for the following: firstly, polarity changing of its output signal for the opposite one with the negative vertical accelerations. Secondly, provision is made for eliminating any harmful influence of the vertical acceleration (positive and negative) on the horizontal acceleration determination device. The authors have for their object to provide new devices for determining the horizontal [3], [4] and the vertical [5], [6] accelerations, correspondingly. Both of these devices have been performed in the similar way in terms of construction, but use is made of them being located mutually perpendicular. Each of the said devices is considered to have a pair of the inner cavities of the vessels (vessel) to be filled with the flowing medium and to be provided with the pressure sensors, the signals whereof are transmitted to the measuring differential block (to the measuring differential scheme). Another embodiment of the bipolar determiner of the accelerations difference (BDAD) provides the aggregate of the known accelerometer, the devices for determining the vertical and the horizontal accelerations, as well as the electrical bridge, all of them being interconnected.

The contour of the cross-section of the inner cavity of each vessel of the horizontal acceleration determination device mentioned [3], [4] is said to have the upper and the lower points, they remaining as such (the upper and the lower, correspondingly) with the permissible tilting in the working position.

The contour of the cross-section of the inner cavity of each vessel of the vertical acceleration determination device [5], [6] is said to have two extreme, the outermost in terms of the horizontal (on either side) points, they remaining as such (the extreme, the outermost) with the permissible tilting in the working position.

The straight lines (belonging to the said contours) passing through the said points are said to be chosen parallel (particularly, they being superposed into one) and perpendicular to the said parallel straight lines (particularly, superposed into one) passing through the corresponding upper and lower points of the horizontal acceleration determination device.

The contour of the cross-section of the inner cavity of each vessel of the horizontal acceleration determination device is said to be asymmetrical relating to the said straight line passing through the upper and lower points (it containing the said points).

The contour of the cross-section of the inner cavity of each vessels of the vertical acceleration determination device is said to be asymmetrical relating to the said straight line passing through the extreme, the outermost, in terms of the horizontal, points (it containing the said points).

The contours of the cross-sections of the inner cavities of the vessels of each device for determining the horizontal or vertical accelerations correspondingly, are considered to be counter-oriented regarding one another.

The pressure determination points are chosen in the said contours to be similarly located on the above mentioned parallel straight lines (particularly, on the superposed straight line).

While applying each joint pair of the pressure sensors having one common sensing element, the corresponding parallel straight lines are said to be superposed into one straight line. In this case, each corresponding pair of the inner cavities has been chosen with the common wall, particularly, containing an elastic diaphragm, for example, a membrane. Artificially created capacitors (the electrodes whereof being, in particular, the above mentioned metallic coatings and diaphragm) are said to be switched to the measuring differential blocks (measuring differential schemes), from the outputs whereof there are taken the signals of the horizontal and vertical accelerations.

The signal of the vertical acceleration $a_\eta$ is supplied (from the said vertical acceleration determination device) to one of the electrical bridge diagonals, the neighboring arms whereof there are provided with the signals of the apparent acceleration $a_{\kappa_\xi}$ (from the accelerometer) and the horizontal acceleration $a_\xi$ (from the horizontal acceleration determination device). Into other neighboring bridge arms there are included electrical elements with electrical parameters to be determined by the output electrical parameters values of the said accelerometer and the horizontal acceleration determination device with balanced (initial) state of the said electrical bridge. From another diagonal of the said bridge there is provided the signal $a_\xi \sin v \approx a_\eta v$ to the actuating mechanism, which is said to adjust the platform tilting (with the vessels) till the angle v close to 0.

Integrating the value of the vertical acceleration there is obtained a vertical velocity, and with the double integrating of the said acceleration there is obtained the flight altitude (the depth of submergence in water) under any conditions, including those in airless space (at higher altitudes).

In case of applying the liquid with the gas bubbles, the resulting volume of the said bubbles is chosen to be less than the volume of the said liquid forced out by the said diaphragm at the most possible acceleration.

The transverse accelerations (lateral, vertical in the horizontal acceleration determination device, in particular, longitudinal $a_\xi$; the horizontal accelerations $a_\xi$ and $a_\zeta$ in the vertical acceleration determination device) are not expected to cause the diaphragm deflection (since they cause similar pressures on either side of the said diaphragm).

For preventing any harmful (even insignificant one) influence of the said gas bubbles (while applying the liquid with the gas bubbles as the flowing medium) provision is made for the system of heating. In this case, the said bubbles are concentrated in the warmest place and, in particular, it is for the latter that provision is made for the specially heated accumulating chamber in each inner cavity of the vessel. When applying the said accumulating chamber, the said gas bubbles are concentrated in the place of heating. It is through the latter that there is performed their insulation from the working medium of the said inner cavity of the vessel. The position of the said chamber is chosen in the way that the point in the said contour of the cross-section of the inner cavity of the vessel expected to be the upper, the lower or the extreme (within the permissible tilting in the working position) would remain as such (the upper, the lower, or the extreme, correspondingly). Heating is performed, for example, by the electrical current passing through the winding wound on the place (part) required of the accumulating chamber (its gas part).

For preventing any harmful influence of the linear vibrations and temperature the said vessels are positioned on the moving object in the parts with the similar vibrations and temperature. Herewith, for eliminating any harmful influence of the angular vibrations the location of each jointly used pairs of the vessels has been chosen to be similar. With this compact disposition of the said vessels any harmful influence of the centripetal and Coriolis accelerations is said to be practically eliminated. Moreover, with the angular vibrations there occurs mutual compensation of the said vertical and horizontal accelerations.

In case use is made of the piezoelectric element as the sensing element of pressure, it is considered to provide the signal of the acceleration derivative. In the case mentioned the said acceleration can be obtained by means of integrating the said signal of the said derivative. Herewith, the power supply is not required.

For zero calibration, i.e. achieving zero value of the output signal of the vertical determination device in the initial (in particular, stationary) position, in each vessel provision is made for the screw. With screwing the said screw into the vessel inner cavity (particularly, of the said accumulating chamber), the pressure in the cavity mentioned increases and the volume of the said gas bubbles decreases.

Applying two insulated from each other vessels, separated by the said elastic diaphragm is expected to cause the necessity of the presence of the said gas bubbles, which is said to make the said construction more complicated.

Therefore, use is made by the authors of the accelerations determination devices provided not with two (miniature) vessels (two-vessel devices) but with one (miniature) vessel (one-vessel devices).

One-vessel devices are made in the similar way as two-vessel devices, but in each of the former the elastic diaphragm is used with the holes. The said diaphragm is considered to divide two inner cavities of the vessel.

Herewith, in each contour of the cross-section of each inner cavity there are the same characteristic points (the upper and the lower, the extreme, correspondingly) as in the two-vessel horizontal acceleration determination devices.

The vertical acceleration in the said one-vessel horizontal acceleration determination device is not expected to cause the deflection of the elastic diaphragm due to the same reasons as in the two-vessel devices of the prior art. The horizontal acceleration, in its turn, is considered to cause the deflection the elastic part of the said diaphragm in the device mentioned, since the volume of the flowing medium does not change herewith.

The horizontal acceleration in the said one-vessel vertical acceleration device is not expected to cause the bowing (deflection) of the said elastic diaphragm due to the same reasons as in the two-vessel devices of the prior art. The vertical acceleration, in contrast, is said to cause the deflection of the said elastic diaphragm in the device mentioned under the influence of the pressures difference arising herewith (sensitivity threshold being equal to zero), since the volume of the flowing medium does not change herewith.

Preventing any harmful influence of the transverse accelerations can be implemented with the help of the cross-sections of the inner cavities of the vessels and without the upper, lower or extreme points (remaining as such with permissible tilting). But the solution of that kind turns out to be less efficient (more complicated, heavier, harder).

The said one-channel device of the vertical determination (OChVDD) enables one in the two-channel vertical acceleration determination device (TChVDD) to implement platform stabilization in the horizontal plane (in the horizontal position).

The TChVDD can be double-axis or multi-axis, with the gyroscope or without the latter.

The two-channel double-axis vertical determination device is said to contain two frames positioned in the suspension: object (external and additional (internal).

Herewith, the role of the platform can be played by the additional frame alone, or by the two frames (depending on the type of the moving object tilting). Along the axis (shaft) of each of these frames there is located the OChVDD. Herewith, the body of the actuating mechanism of the object frame is rigorously fastened on the moving object body, and the said axis (shaft) of the said mechanism is the axis (shaft) of the said frame rotation. Alternatively, the body of the actuating mechanism of the additional frame is fastened on the said object frame, and its axis (shaft) is the axis (shaft) of the additional frame perpendicular to the said axis (shaft) of rotating the object frame.

By introducing intermediate frames into the TChVDD, each of them being located on the axis (shaft) of the OCh-VDD, the stabilization accuracy increases and by increasing the number of the said intermediate frames it is possible to achieve practically complete insulation of the said platform from possible evolutions of the said moving object. By introducing each intermediate frame its axis (shaft) becomes the axis (shaft) of the said actuating mechanism of the OChVDD to be introduced, and the body of the said mechanism being rigorously fastened on the preceding frame, the axis (shaft) whereof is said to be perpendicular to the said axis (shaft) of rotating of the newly introduced intermediate frame.

It should be stressed that in the prior art (gyro horizon, inertial gyro vertical, gyrostabilizer) there are also introduced intermediate frames. However, the efficiency of such introduction in the present solution is considered to be higher than in the prior art, since herewith, there takes place adjustment of each frame relating to the horizontal plane (at the angle of non-horizontality), and in the prior art—at the angle of one frame tilting in relation to another one.

The opportunity of eliminating the necessity of applying the said gyro platform is considered to make the construction of the devices lighter, cheaper, simpler, more compact.

The present solutions having for an object to determine the vertical are to prevent any harmful influence of the horizontal accelerations, the latter including translatory accelerations as well as centripetal and Coriolis ones caused by the moving object movement and the Earth rotation. Therefore, the present invention, unlike the prior art, is considered to determine the gravitational vertical caused by the gravitational force and not by the gravity force.

Thus, the present application has for an object to provide a technical solution containing the method (process) and the device for its implementation, both being the unity as a result of one common inventive idea and conception (the vertical determination). This new determination of the vertical has become possible owing to the novel solutions of determining the horizontal and vertical accelerations to have been developed by the authors.

BRIEF DESCRIPTION OF THE DRAWINGS

The present technical solution is explained and illustrated, by way of example, in the accompanying drawings, in which it is shown as follows.

NOTES

On the accompanying drawings the thickness of the vessels walls is not shown.

Figure 6:
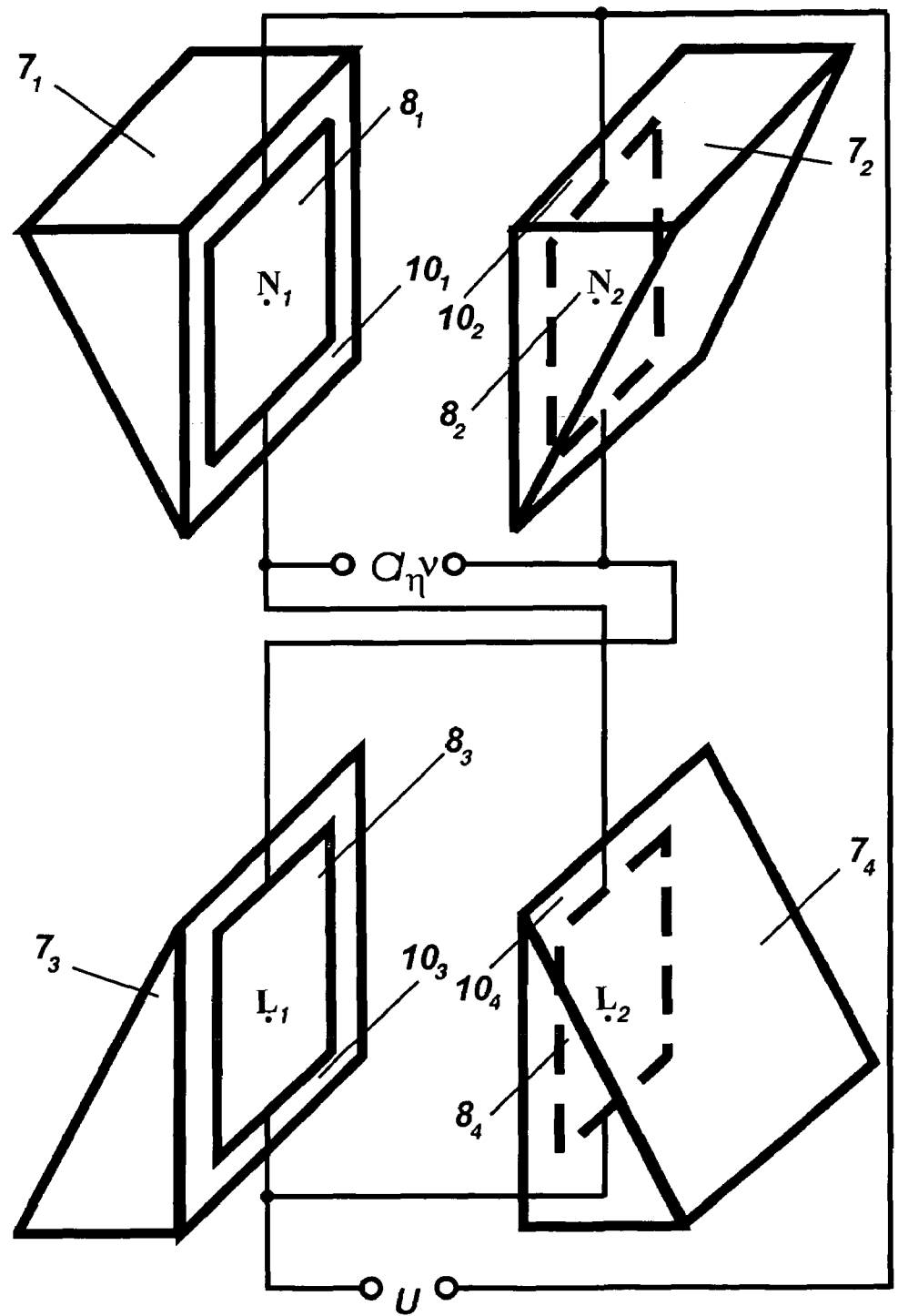
FIG. 6—a scheme of the bipolar determiner of the accelerations difference with the electrical bridge and with the pressure sensors, each of which having its sensing element.

In FIG. 6 the sensing elements of the pressure sensors are conventionally shown in the form of the rectangles.

On the other drawings the pressure sensors (particularly, their sensing elements) are not shown, but the points of pressure determination by the said sensors are shown.

DETAILED DESCRIPTION OF THE INVENTION

By way of example, the present solution comprising the case of positioning the said sensitivity axis of the apparent acceleration (accelerometer) close to the horizontal, particularly, to the horizontal axis $\xi$, will appear as the following detailed description proceeds.

The determination of the gravitational vertical under consideration is based (in each of the two channels) on determining, irrespective of disturbing factors acting (inertia forces of different direction, vibrations, temperature and others), the apparent and horizontal accelerations in the vertical plane (i.e. the plane passing through the vertical axis of the platform, whereon the said accelerations are determined), determining the said accelerations difference, as well as bringing the said difference up to zero, particularly, by means of the said platform tilting. The said platform position enables it to determine the gravitational vertical.

Herewith, the determination of the accelerations mentioned is implemented in the parallel planes, particularly, superposed into one. Any of the said planes will be called the plane of the accelerations determination (particularly, the determination plane). This plane is vertical, since it has been chosen passing through the mutually perpendicular axes of the platform mentioned, one of which being its vertical axis (particularly, the said plane being chosen passing through the lines of the said platform, the ones parallel to the said axes). Another axis of the kind has been chosen, in particular, to be the axis parallel to the longitudinal (or lateral) axis of the moving object (particularly, superposed with any of them).

Figure 1:
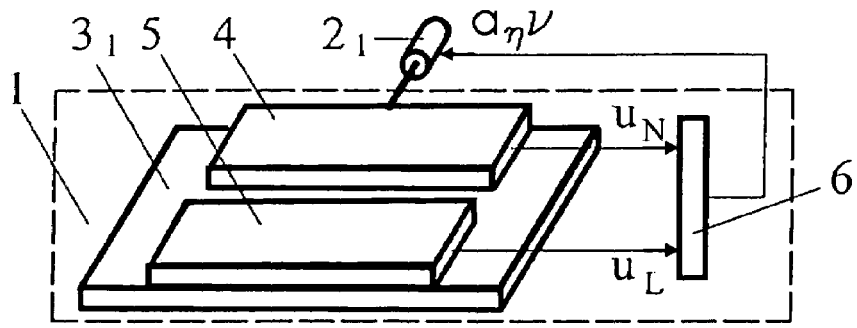
FIG. 1—a structural scheme of the non-gyro scope one-channel device for the determination of the gravitational vertical.
Figure 2:
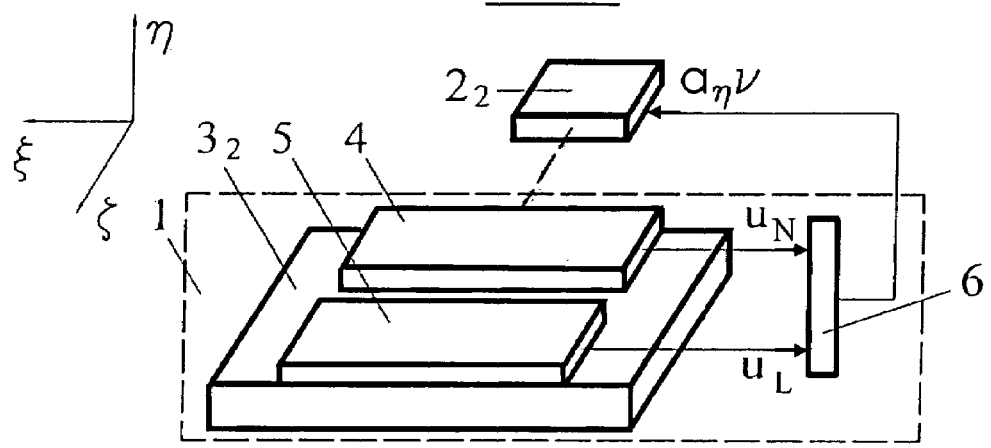
FIG. 2—a structural scheme of the object one-channel device for the determination of the gravitational vertical.
Figure 3:
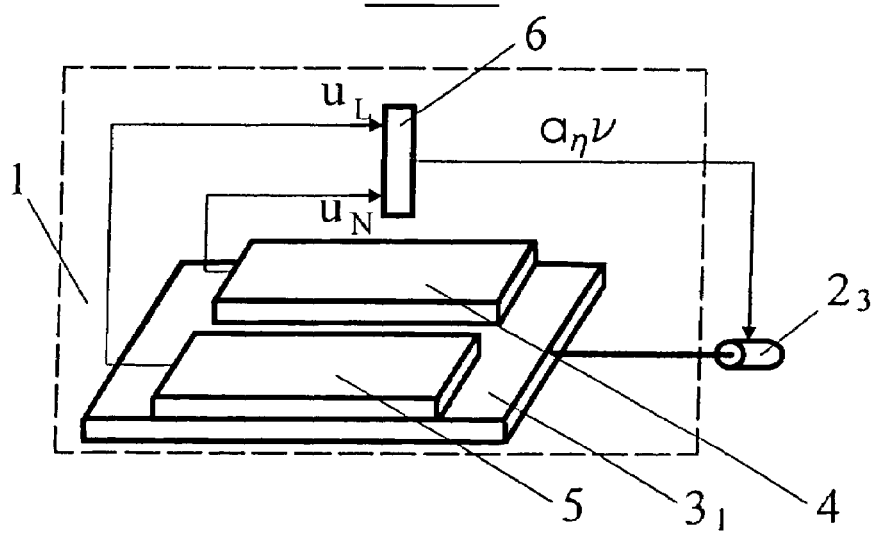
FIG. 3—a structural scheme of the gyro scope one-channel device for the determination of the gravitational vertical.
Figure 19:
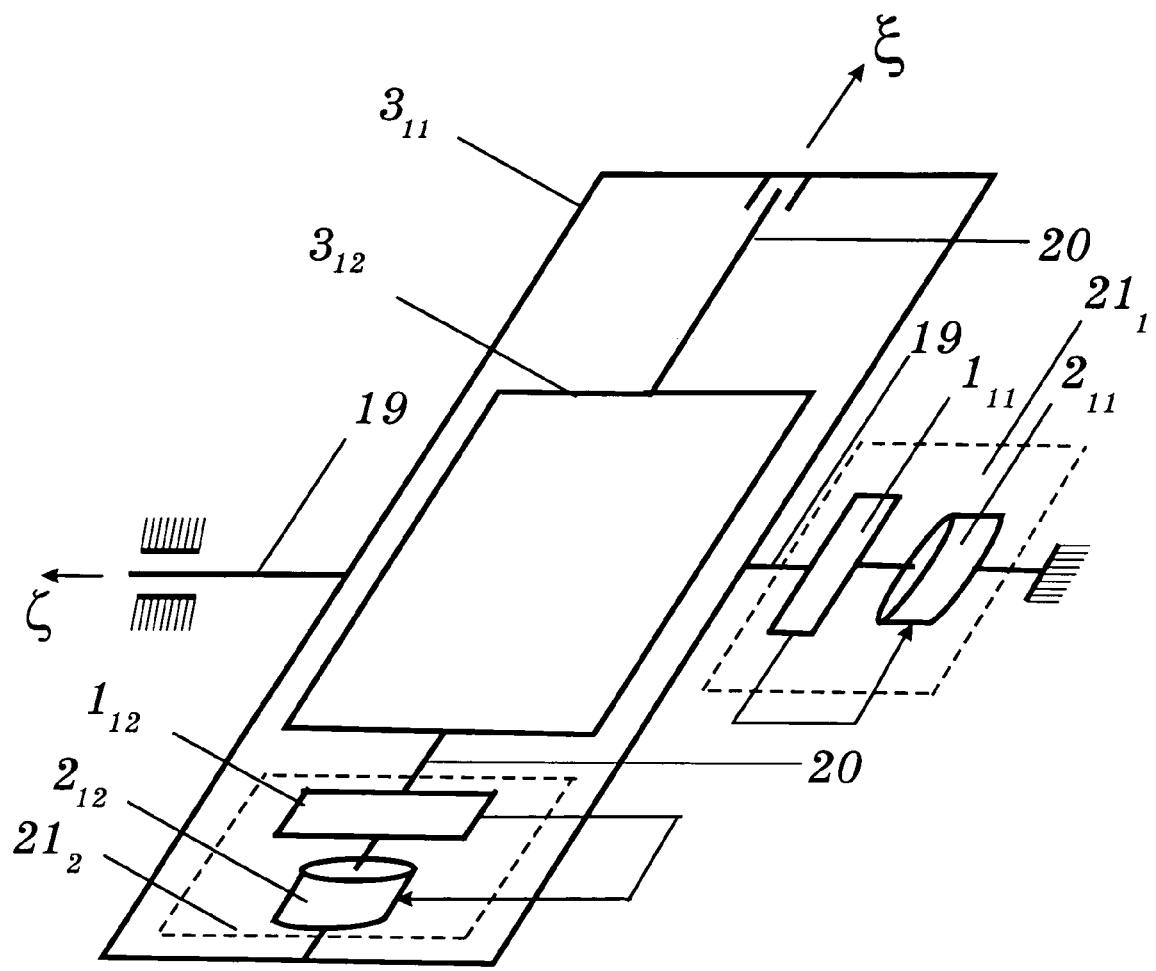
FIG. 19—a scheme of the two-channel double-axis device for determining the gravitational vertical.

In accordance with the present method a detailed description of the devices for determining the gravitational vertical is expected to be implemented as follows:

a structural scheme of one-channel gravitational vertical determination device (OChGVDD) (FIGS. 1, 2, 3);

a bipolar determiner of the accelerations difference (BDAD) 1 with the pressure sensors, each of which having its sensing element (pressure);

a bipolar determiner of the accelerations difference (BDAD) 1 with the pressure sensors, each joint pair whereof having one (common) sensing element (pressure);

a two-channel gravitational vertical determination device (TChVDD) (FIG. 19);

According to the solution the one-channel vertical determination device (OChVDD) consists of the said bipolar determiner of the accelerations difference (BDAD) 1 (FIGS. 1-7, 16, 18) and the said actuating mechanism (AM) $2_1, 2_2, 2_3$ (FIGS. 1-3) to be connected with the former.

As the AM there has been chosen an electrical mechanism $2_1$ (an electrical motor, an electrical motor with the built-in reducer, a motor-generator, an electrical magnet and the like), a robot pilot $2_2$ (FIG. 2), the role whereof can be performed by the pilot; and the erection motor $2_3$ (FIG. 3):

As the base (foundation) 3 (FIGS. 4, 5) of the said bipolar determiner of the accelerations difference (BDAD) the choice is made of the stabilization platform $3_1$ (FIGS. 1, 3) or the said body of the moving object $3_2$ (FIG. 2), whereon use is made of the OCHVDD).

Depending on the fact what is used as the actuating mechanism (AM) and the said base 3, the OChVDD proposed can be non-gyro scopic (NV) (FIG. 1), object (OV) (FIG. 2) and gyro scopic (GV) (FIG. 3).

In the NV (FIG. 1) as the AM the said electrical mechanism $2_1$ has been chosen rotating the said platform $3_1$ around its axis connected with the said platform directly or through some transfer mechanism. Herewith, the body of the said electrical mechanism is fastened on the body of the moving object or on the suspension frame.

If we take a motor generator as an electrical mechanism, then the output of its generator is connected (electrically) to the input of its motor.

In the (OV) (FIG. 2) as the base (platform) 3 there has been chosen the body $3_2$ of the moving object (whereon use is made of the OChVDD), and as the AM there has been chosen the robot pilot $2_2$ (or a pilot), acting on the driving units of the moving object, (for example, on the aircraft—a rudder and an elevator, correspondingly).

In the GV by each of the axes (in each channel) as the AM there has been chosen the erection motor $2_3$, it working in the delayed mode and causing the said platform $3_1$ precession around the axis perpendicular to the axis of the said motor. As the said platform there has been chosen, in particular, the inner frame of the gyro scope. One should keep in mind that in the GV, irrespective of each other, there are two one-channel devices for the gravitational vertical determination (OChVDD). Herewith, stabilizing the platform in the horizontal plane is implemented relative to the axes of the internal and external gyroscope frames.

The BDAD 1 is said to consist of 2 pickups 4 and 5, the outputs thereof being switched to the determining differential block 6 (FIGS. 1-5). One of these pickups, for example, 4, conventionally called the lower (it containing the lower points $B_1$ and $B_2$), then the pickup 5 can be called the upper (it containing the upper points $A_1$ and $A_2$).

Figure 4:
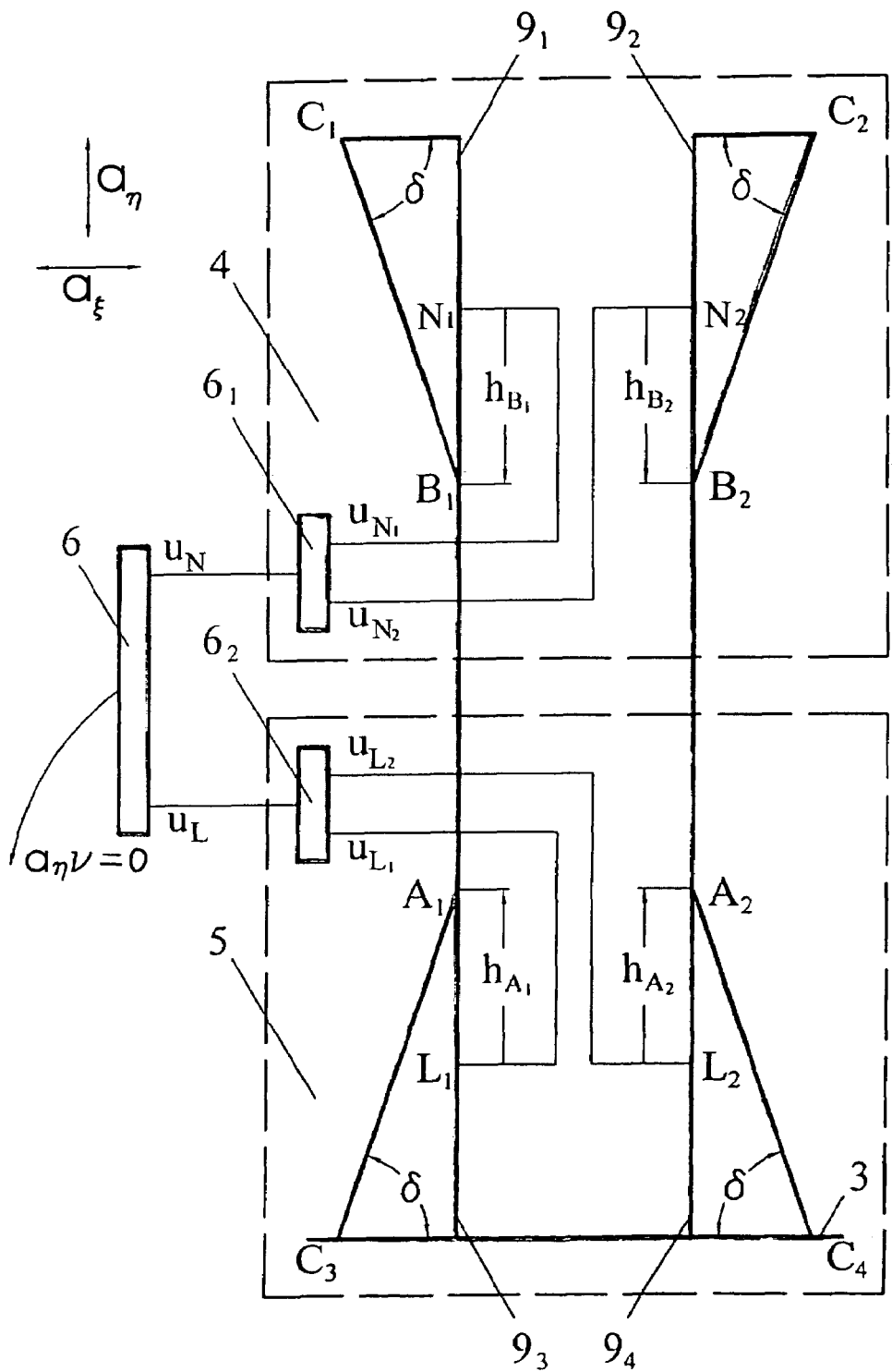
FIG. 4—a scheme of the bipolar determiner of the accelerations difference in the horizontal position with the pressure sensors, each of which having its sensing element.
Figure 5:
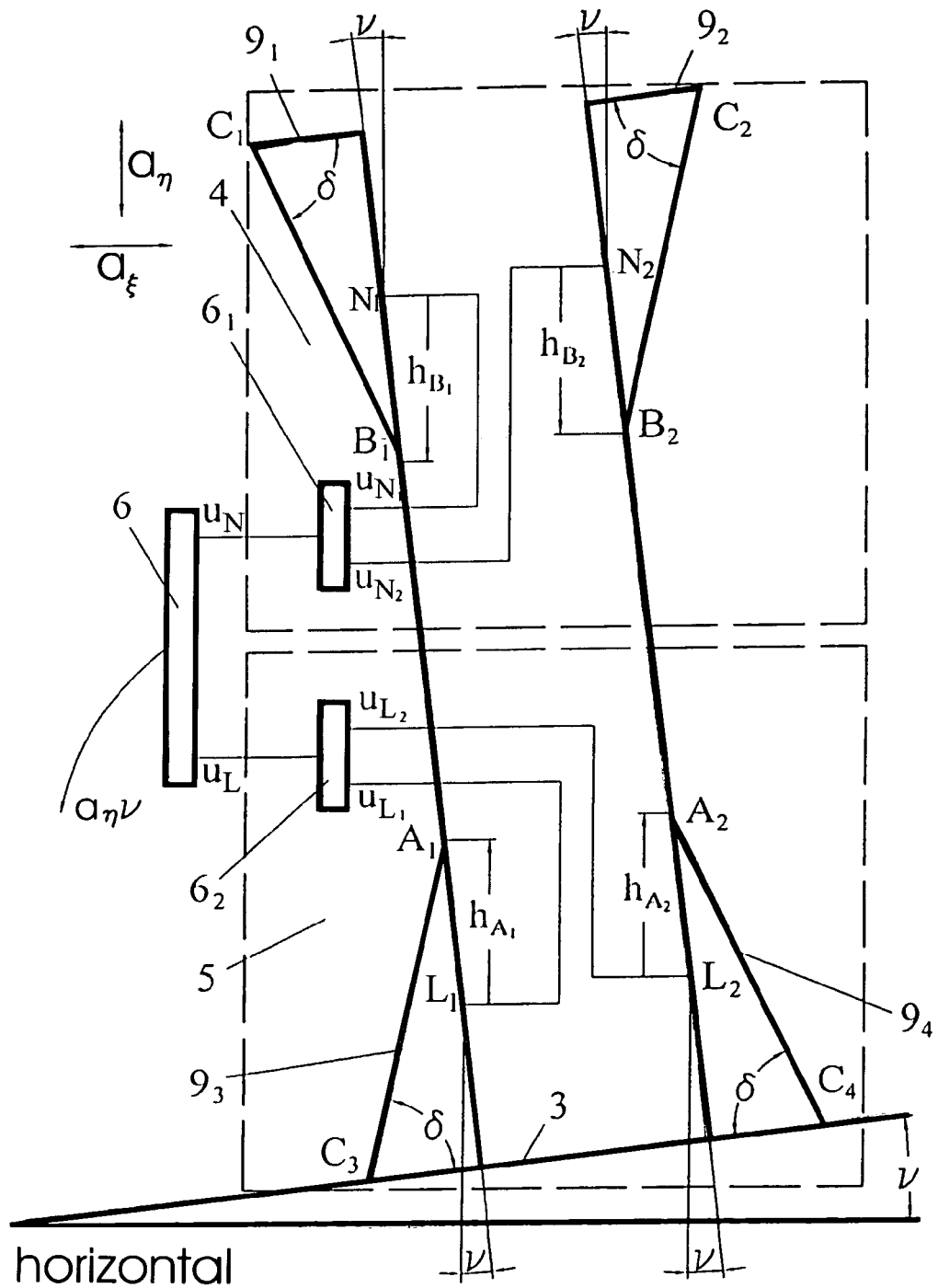
FIG. 5—a scheme of the bipolar determiner of the accelerations difference in the tilting position with the pressure sensors, each of which having its sensing element.

The lower pickup 4 is said to consist of two sealed rigorously interconnected (rigorously fastened on the base 3) miniature vessels $7_1$ and $7_2$ (FIGS. 6-8), filled with the flowing medium (liquid, gas, or the liquid with gas bubbles), and the measuring differential block (measuring differential scheme) $6_1$ (FIGS. 4, 5).

The upper pickup 5 is said to consist of two sealed, rigorously fastened on the platform 3 miniature vessels $7_3$ and $7_4$ (FIGS. 6-8) filled with the flowing medium (liquid, gas or liquid with gas bubbles) and the measuring differential block (measuring differential scheme) $6_2$ (FIGS. 4, 5).

In each of the said pickups (4, 5) there is an even number of the pressure sensors, for example, two pressure sensors. Each joint pair of the pressure sensors can have one sensing (common for both pressure sensors) or two sensing elements (each pressure sensor having its sensing element).

Further a detailed consideration will mainly be given to the embodiment with two sensing elements in each of the pickups 4 and 5, and then the peculiarities of the embodiment with one sensing element will be considered.

Figure 7:
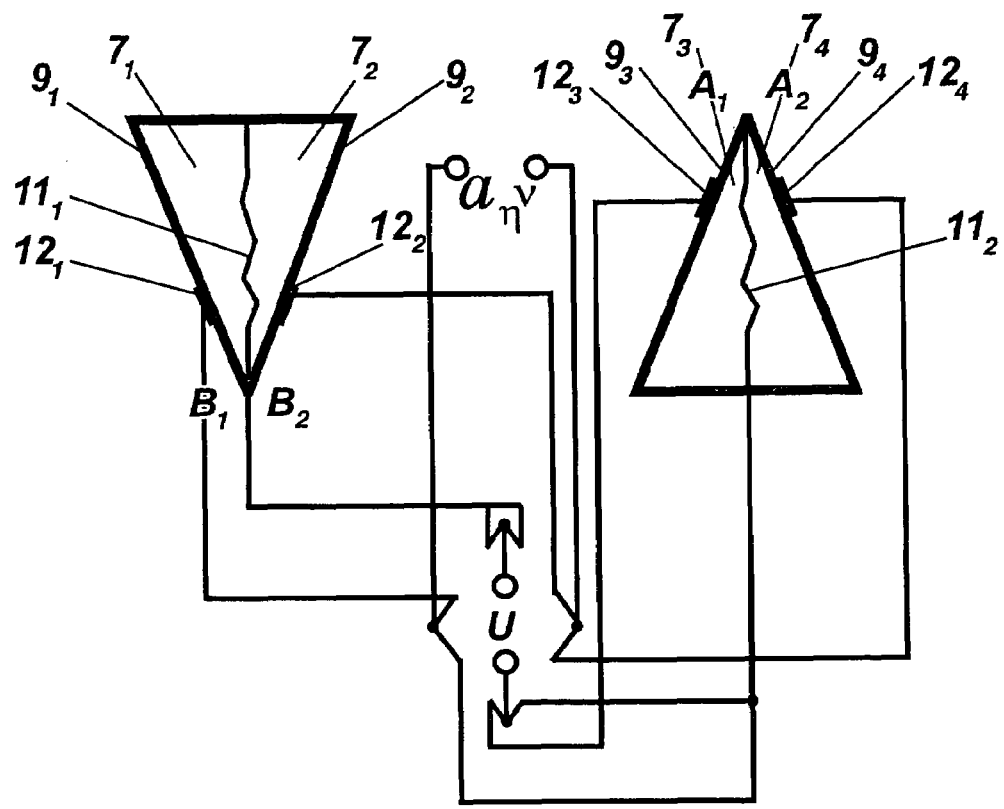
FIG. 7—a scheme of the bipolar determiner of the accelerations difference with the pressure sensors, each joint pair of which having one sensing element.

In FIG. 6 there are conventionally shown rectangle-like sensing elements $8_1$, and $8_2$, $8_3$ and $8_4$ of the pressure sensors switched to the measuring differential blocks (measuring differential schemes) $6_1$ and $6_2$ (FIGS. 4, 5), correspondingly, which, in their turn, being switched to the determining differential block (determining differential scheme) 6 (FIGS. 4, 5), in particular, it being the electrical bridge (FIGS. 6, 7).

The contours $9_1$, and $9_2$, $9_3$ and $9_4$ (FIGS. 4, 5, 7) of the cross-sections of the inner cavities of the vessels $7_1$ and $7_2$, $7_3$ and $7_4$ are located in the parallel planes, particularly, superposed into one, further called the plane of accelerations determination (particularly, the determination plane). The said plane passes through the mutually perpendicular axes, one of which is the vertical axis of the platform 3 (in particular, through the line parallel to the said axis).

The contours $9_1$ and $9_2$, of the vessels $7_1$ and $7_2$ are said to have the upper points $B_1$ and $B_2$, correspondingly, they remaining as such (the lower) within the permissible tilting OChVDD (platform 3) in the working position at the angles $v \leq \delta$ (where v—the angle of non-horizontality OChVDD), i.e. the angle of the said platform 3 tilting, namely, the vessels, in the accelerations determination plane relative to the horizontal plane; $\delta$—the maximum permissible angle of the non-horizontality).

The contours $9_3$ and $9_4$ of the vessels $7_3$ and $7_4$ are said to have corresponding upper points $A_1$ and $A_2$, they remaining as such (the upper) within the said limits.

Thus, under the angle $\delta$ we will mean the maximum permissible angle of tilting v, at which the said lower and upper points are said to remain as such (lower and upper).

The points of the pressure determination in the pickup 4 are marked as $\pi_1$ and $\pi_2$, and in the pickup 5—as $L_1$ and $L_2$ (FIGS. 4, 5, 6), correspondingly. The said points are chosen similarly located in the inner cavities of the vessels. This means that with the congruent position of the corresponding contours $9_1$ and $9_2$, $9_3$ and $9_4$ (which is possible after manufacturing the vessels, but before assembling the OChVDD) and supposedly their parallel transferring till their complete superposition (which is possible owing to the contours similarity), the points of the pressure determination $\pi_1$ and $\pi_2$, $L_1$ and $L_2$ of each joint pair of the said contours are said to superpose as well.

Furthermore, the points of the pressure determination are chosen to be located also on the contours-belonged parallel straight lines passing through the lower and upper points, correspondingly. Herewith, the points of the pressure determination are chosen to be located, correspondingly, at the similar distances from the upper and lower points, i.e. $N_1B_1=N_2B_2$, $L_1A_1=L_2A_2$. In particular, there are chosen. $N_1B_1=N_2B_2=L_1A_1=L_2A_2$.

In FIGS. 4-16 there are shown the contours of the cross-sections of the inner cavities in the form of a triangle. It is possible to have the contours of another form as well (similar being preferable) but they are to be non-congruent, which enables it to determine accelerations (longitudinal $a_\xi$ in the horizontal plane and the vertical $a_\eta$ in the vertical plane).

This non-congruence is achieved by the asymmetry of each of the said contours and by the counter-orientation of the said contours in each corresponding joint pair of the contours ($9_1$ and $9_2$, $9_3$ and $9_4$).

The asymmetry mentioned is performed relative to the corresponding straight line (passing in the contours $9_1$ and $9_2$, through the lower point, and in the contours $9_3$ and $9_4$—through the upper point, correspondingly).

Under the counter-orientation of the contours of each joint pair we mean the position of their extreme (along the horizontal) points ($C_1$ and $C_2$, $C_3$ and $C_4$, correspondingly) on either sides from the above mentioned straight lines, in particular, from their parts $N_1B_1$ and $N_2B_2$, $A_1L_1$ and $A_2L_2$.

The similar disposition of the points determining pressure ($N_1$ and $N_2$, $L_1$ and $L_2$) in the inner cavities of the vessels is said to prevent any harmful effect of the lateral (transverse) acceleration $a_\zeta$ (directed perpendicular to the plane of the accelerations determination, i.e. along the horizontal axis $\zeta$). This is accounted for the fact that the lengths of the horizontal columns of the flowing medium acting on the points of the pressure determination $L_1$ and $L_2$, $N_1$ and $N_2$, in the lateral (transverse) direction are said to be equal irrespective of the tilting.

The said disposition of the points of the pressure determination on the parallel straight lines is said to prevent any harmful influence of the negative vertical acceleration ($a_\eta<0$) in the contours $9_1$ and $9_2$, and the positive vertical acceleration ($a_\eta>0$) in the contours $9_3$ and $9_4$. This is explained by the fact that the heights of the vertical columns (i.e. those to be determined at the vertical) of the flowing medium to be located under the points $N_1$ and $N_2$ ($h_{B_1}$ and $h_{B_2}$) and above the points $L_1$ and $L_2$ ($h_{A_1}$ and $h_{A_2}$), being changed with the permissible tilting, are said to remain equal, i.e. $h_{B_1}=h_{B_2}$, $h_{A_1}=h_{A_2}$.

It's true that $h_{B_1}=B_1N_1 \cos v$, $h_{B_2}=B_2N_2 \cos v$, $h_{A_1}=A_1L_1 \cos v$, $h_{A_2}=A_2L_2 \cos v$.

Since the authors have chosen $B_1N_1=B_2N_2$, $A_1L_1=A_2L_2$ then $h_{B_1}=h_{B_2}$, $h_{A_1}=h_{A_2}$.

Choosing, in particular, $B_1N_1=B_2N_2=A_1L_1=A_2L_2$, we have $h_{B_1}=h_{B_2}=h_{A_1}=h_{A_2}$.

As each differential block (differential scheme) use can be made of a electrical bridge, a magnet amplifier on the differential scheme, an electrical scheme of the electrical parameters difference (electrical voltages, currents, resistances, capacities, inductances).

In the present application choice is made, particularly, of the electrical bridge consisting of 4 arms (FIGS. 6, 7). The said bridge is powered by the electrical voltage U supplied through one of its diagonals, and from another diagonal of the bridge the output signal $a_\eta \sin v \approx a_\eta v$ is taken.

As the sensing elements of the pressure use can be principally made of any known sensing elements of the pressure ($8_1$, and $8_2$, $8_3$ and $8_4$), in particular, resistive-strain sensors. Herewith, they can be located either on the inner or on the outer side of the lateral walls $10_1$ and $10_2$, $10_3$ and $10_4$, (FIG. 6) of the vessels $7_1$ and $7_2$, $7_3$ and $7_4$, correspondingly. In case the choice is made of the semiconductor resistive-strain sensors (the specific resistance whereof changes under the pressure influence), they can be located on the inner sides of the lateral walls. In case the choice is made of the wire—wound or membranous (foil) resistive-strain sensors, then they can be located on the side walls containing the elastic diaphragms, the latter becoming deformed (strained, extended or shrunk) under the pressure influence. In this very case the said resistive-strain sensors can be positioned both on the exterior and on the inner sides of the side walls of the vessels.

Any pressure sensor gives out the signal of one value corresponding to the definite point (or the level) of the pressure of the flowing medium although many points of the sensing element of the said pickup are known to react on the pressures. This very signal is also considered to correspond to the particular point of the said sensing element (further, the pressure signal point). Depending on the form of the sensing element, the centre of a circle or a rectangle and the like can serve as this very point. It is obvious, that for determining the pressure in some point, (for example, $N_1$, $N_2$, $L_1$, $L_2$), it is necessary to superpose this very point with the pressure signal point. Such superposing (of the points of different surfaces or volumes) is like a known task solved, in many cases, (for example, superposing the source of light with the most acceptable point in space, while fitting tooth prostheses, etc.).

An analytical solution of such superposing is confirmed by the experimental testing.

It should be kept in mind that in the pickup 5 (in the scheme with the upper points $A_1$ and $A_2$) there are lots of points $L_1$ and $L_2$ similarly located in pairs in the contours $9_3$ and $9_4$, the heights $h_{A_1}$ and $h_{A_2}$ (to be determined at the vertical) of the vertical columns of the working medium, over which being changed with the permissible tilting (for the angles $v \leq \delta$) of the pressure 5 (platform 3) are said to be equal ($h_{A_1}=h_{A_2}$). In particular, the said points are considered to be the cones $A_1$ and $A_2$, for which $h_{A_1}=h_{A_2}=0$.

In much the same way, in the pickup 4 (in the scheme with the lower points $B_1$ and $B_2$) there are lots of similarly in pair-located points $N_1$ and $N_2$ in the contours of the sections $9_1$ and $9_2$, the heights $h_{B_1}$ and $h_{B_2}$ (determined also at the vertical) of the vertical columns of the flowing medium, under which while changing with the permissible tilting mentioned of the pickup 4 (platform 3) are said to remain equal ($h_{B_1}=h_{B_2}$).

Strict proof of identities $h_{A_1}=h_{A_2}$ ($h_{B_1}=h_{B_2}$).

is said to be contained in [2], [3], [4], [5], [6].

The signal $u_{N_1}$ of the sensing element of the pressure $8_1$ (the signal of the pressure in the point $N_1$) and the signal $u_{N_2}$ of the sensing element of the pressure $8_2$ (the signal of the pressure in the point $N_2$) are supplied to the measuring differential block (in the measuring differential scheme) $6_1$, the output wherefrom there is taken the said signals difference (FIGS. 4, 5), equal to $$u_N=u_{N_1}-u_{N_2}, \qquad (7)$$

to be supplied to the determining differential block 6.

The signal $u_{L_1}$ from the sensing element $8_3$ (the pressure signal in the point $L_1$) and the signal $u_{L_2}$ from the sensing element $8_4$ (the signal in the point $L_2$) are supplied to the measuring differential block (to the measuring differential scheme) $6_2$, from the output whereof there is taken the said signals difference (FIGS. 4, 5), equal to $$u_L=u_{L_1}-u_{L_2}, \qquad (8)$$

Thus, from the output of the determining differential block 6 (the output signal of the BDAD) there is taken the signals difference equal to $$\Delta u = u_N - u_L = a_\eta \sin \nu \approx a_\eta \nu \qquad (9)$$

The equation of the heights $h_{A_1}$ and $h_{A_2}$ means that the pressures caused by the positive vertical acceleration ($a_\eta > 0$) in the points $L_1$ and $L_2$ are said to be always equal. Thus, the positive vertical acceleration ($a_\eta > 0$) is not considered to cause any harmful influence on the operation of the pickup 5. As a consequence, in case ($a_\eta > 0$) the pickup 5 measures the horizontal acceleration $a_\xi$, i.e. it works in the mode of the horizontal acceleration determination device $a_\xi$.

The equation of the heights $h_{B_1}$ and $h_{B_2}$ means that the pressures produced by the negative vertical acceleration ($a_\eta < 0$) in the points $N_1$ and $N_2$ are always equal. Therefore, the negative vertical acceleration ($a_\eta < 0$) is not said to cause any harmful influence on the operation of the pickup 4. Thus, in case $a_\eta < 0$ the pickup 4 determines the horizontal acceleration $a_\xi$, i.e. it also works in the mode of the horizontal acceleration determination device $a_\xi$.

Since the differential signal $\Delta u$ is adjusted by the actuating mechanism practically till zero, one can consider the angle $\nu$ fairly small (nor more than fractions of an arch second). Thus, with a very high accuracy we can assume $\cos \nu = 1$, $\sin \nu = \nu$.

Taking the above into account, it is possible to consider with a very higher accuracy that if in FIGS. 4, 5 the acceleration $a_\xi$ is directed to the left, then the points $N_1$ and $L_1$ are acted upon by the horizontal columns of the flowing medium (for example, liquid) of the equal length, and in the points $N_2$ and $L_2$ the said pressures are not expected to practically change. Provided that the acceleration $a_\xi$ is directed to the right, then the points $N_2$ and $L_2$ are acted upon by the horizontal columns of the flowing medium of the equal length, and in the points $N_1$ and $L_1$ the pressures are not expected to practically change herewith.

Thus, with choosing $B_1N_1 = B_2N_2 = A_1L_1 = A_2L_2$, under the influence of the acceleration $a_\xi$ equal signals are received at the determining differential block (the determining differential scheme) 6 from the pickups 4 and 5, due to the above the horizontal acceleration $a_\xi$ is not expected to cause any change of the output signal of the provided gravitational vertical determination device.

Thus, the horizontal acceleration $a_\xi$ is not expected to cause any harmful influence on the determination of the vertical.

Each of the pickups 4 and 5 is considered to work depending on the sign $a_\eta$, in one of the two modes: in the mode of the said accelerometer determining the apparent acceleration $a_{\kappa_\xi}$, and in the mode of the horizontal acceleration determination device $a_\xi$ (in the mode of determining $a_\xi$).

Like the said apparent acceleration $a_{\kappa_\xi}$, the horizontal acceleration $a_\xi$ are said to be the projection of the absolute acceleration vector (in the acceleration determination plane), but the said apparent acceleration $a_{\kappa_\xi}$—on the sensitivity axis of the said accelerometer, and the horizontal acceleration $a_\xi$—on the horizontal plane, correspondingly.

Let's consider the peculiarities of operation of the provided one-channel device for determining the gravitational vertical with $a_\eta > 0$ and with $a_\eta < 0$.

With $a_\eta > 0$ the pickup 4 is said to work in the mode of accelerometer, i.e. the device determining the apparent acceleration $$a_{\kappa_\xi} = a_\xi \cos \nu - a_\eta \sin \nu, \qquad (10)$$

and the pickup 5 works in the mode of the horizontal acceleration determination device, i.e. determining the horizontal acceleration $a_\xi$ (with $a_\eta > 0$ the pickup 5 is not said to react on $a_\eta$).

Thus, with $a_\eta > 0$ we have $$\Delta a = a_{\kappa_\xi} - a_\xi \approx -a_\eta \nu. \qquad (5)$$

This signal is said to be supplied to the actuating mechanism which, by tilting the platform 3 ($3_1$ or $3_2$) brings the value $\Delta a$ rather close to zero, thereby holding the said platform in the horizontal position (conjointly with another actuating mechanism acting along the perpendicular axis $\zeta$).

With $a_\eta < 0$, the pickup 4 is not said to react on $a_\eta$ and works in the mode of the horizontal acceleration determination device, i.e. is said to determine $a_\xi$. The pickup 5, in its turn, works in the mode of the accelerometer, i.e. determines the apparent acceleration $a_{\kappa_\xi}$. But since $a_\eta < 0$, then $$a_{\kappa_\xi} = a_\xi \cos \nu - (-a_\eta \sin \nu) = a_\xi \cos \nu + a_\eta \sin \nu \approx a_\xi + a_\eta \nu \qquad (11)$$

So $$\Delta a \approx a_\xi - (a_\xi + a_\eta \nu) \approx -a_\eta \nu \qquad (12)$$

Thus, also with $a_\eta < 0$ in the solution provided the signal of the polarity required (sign or phase) is supplied to the said actuating mechanism for adjusting the platform 3 ($3_1$ or $3_2$) to the angle $\nu$ close to zero.

From (5) and (12) it is seen that the vertical acceleration does not only makes any harmful influence on the operation of the OChVDD, but, moreover, with larger $a_\eta$ there is achieved a higher accuracy of bringing $\nu$ closer to zero (with the horizontal movement $a_\eta = g$, where g—free fall acceleration), It should be also stressed that with an upturned position of the moving object (for example, an aircraft) from the output of the BDAD there is a signal provided to the actuating mechanism, the signal being also of the polarity required, since the lower points of the pickup 4 are said to become the upper ones, the upper points of the pickup 5 are said to become the lower ones. So, in this case there is no need of the commutation of the said output signal BDAD unlike in case of the prior art (for example, in gyro horizon), which, firstly, is considered to make the said solutions more complicated, and, secondly, is considered to exclude continuity of their functioning.

Special attention should also paid to the independence of the operation of the OChVDD from the centripetal and Coriolis accelerations, since the said accelerations are considered to influence the sensing elements of the pressure practically in the similar way, the signals whereof are said to enter the differential block (differential scheme), where one signal is subtracted from another.

Since the values of the angles $\nu$ are said to be rather small (fractions of an arch second), then with a very high accuracy it is possible to consider the lengths of the horizontal columns of the flowing medium acting on the points of the pressure determination to be unchangeable (with tilting).

The threshold of the sensitivity of the OChVDD is practically equal to zero, since the said sensing elements of the pressure are constantly ready (both with $a_\eta > 0$ and with $a_\eta < 0$) to work (there is no non-sensitivity zone overcoming required) under the influence of the pressure of filling the flowing medium into the vessels, and the pressure caused by the vertical columns of the flowing medium, the former located over the points of the pressure determination. Thus, for the solution provided there are not practically any principal obstacles for achieving the accuracy meeting the highest requirements. To use the equation of the threshold of the sensitivity equal to zero in the known gyro stabilized platform seems to be impossible, since therein harmful influence of the vertical acceleration might be possible, which is thought to be rather significant (due to the integration of not only useful but also harmful signals) even with rather small angle v. As for the prototype, it is possible to use the threshold of the sensitivity equal to zero only with $a_\eta > 0$.

The device as disclosed by the invention is automatic. Therefore, its operation stability is to be provided.

In the said non-gyroscope OChVDD (NV) the said stable operation (work) can be implemented by a known way (using the correction units, damping, etc.), in particular, similarly to the way it is done in the scheme of adjusting the bringing frame of the gyroscope, for example in the gyro horizon (through applying the motor-generator). While applying the said motor-generator the said output signal of the said generator is supplied as the signal of the negative feedback to the input of the said motor.

In the gyroscope OChVDD (GV) as disclosed by the invention the stable operation (work is provided by means of insulating the OChVDD from the evolutions of the moving object through positioning the latter on the gyroscope. In this case, the requirements to the gyroscope accuracy may be reduced to a considerable degree (compared with the prior art).

While applying the object OChVDD (OV), using its signal a robot pilot (or a pilot) can perform highly accuracy piloting (an error being not more than a fraction of an arch second), which is thought to be of significance when conducting bombing, an aircraft landing, rockets monitoring, photographing, etc.)

Figure 8:
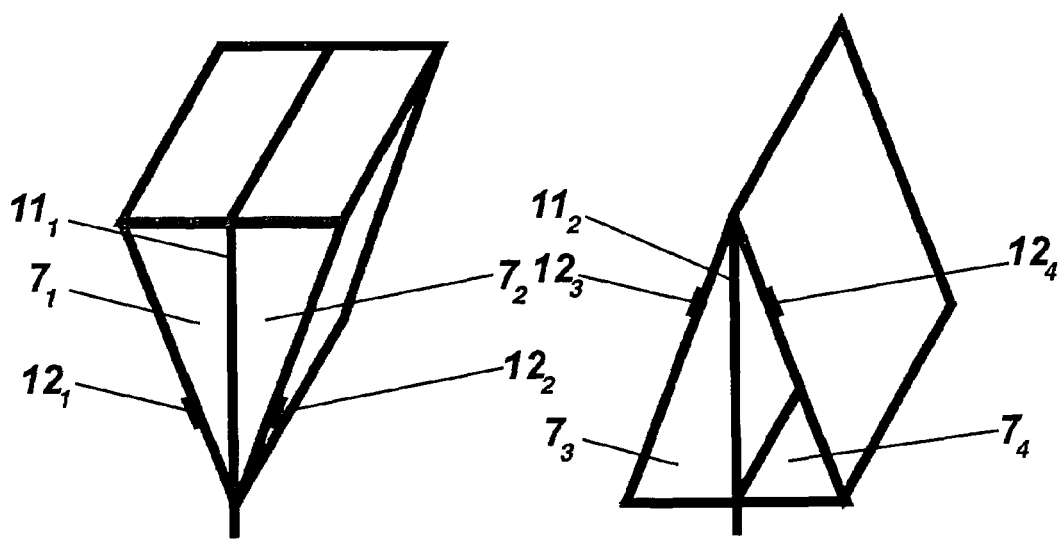
FIG. 8—one of the possible forms of the inner cavities of the vessels, each joint pair of which having one sensing element.
Figure 9:
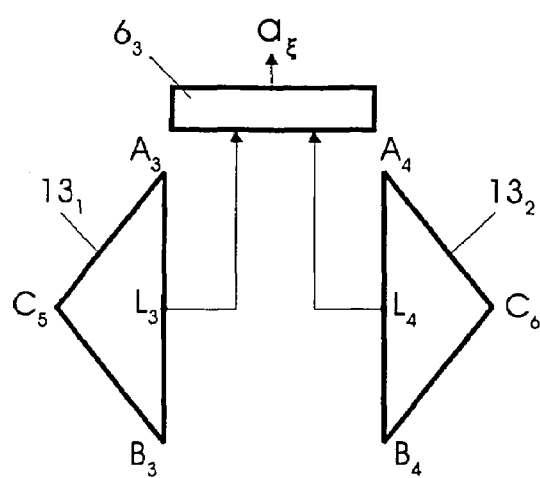
FIG. 9—a scheme of the contours of the cross-sections of the inner cavities of the vessels of the device for determining the horizontal acceleration, wherein each pressure sensor having its sensing element.

For providing the accurate operation of the embodiment, wherein each pressure sensor is said to have its sensing element (of pressure), it is required that for each pair of the said sensors (for each pickup 4 and 5) be chosen sensing elements with approximately similar parameters. For excluding the said necessity (requirement) in FIGS. 7, 8 there is shown an embodiment, wherein each pair of the pressure sensors (the pickup 4 and pickup 5, correspondingly) are considered to have one sensing element (of pressure). As such sensing element the choice is made of the said elastic diaphragm, particularly, a membrane. The aggregate of the points of the said sensing element in each contour of the cross-section of the inner cavity of the vessel is marked by $11_1$ and $11_2$ (FIGS. 7, 8). The said diaphragm is considered to be the common wall (or its part) of the inner cavities of each pair of the vessels (pickup 4 and pickup 5). The said diaphragm is electrically insulated from the said walls of the said cavities, the being also electrically insulated from each other. In particular, the inner cavities of the vessels are made from the insulating material, with partly metallic coating ($12_1$ and $12_2$, $12_3$ and $12_4$) of the sufficient surface. Each said metallic coating is said to play the role of an electrode (coating) of the artificially made capacitor. The second (and common for both capacitors of the said kind) electrode) is considered to be the diaphragm).

Each capacitor of the said kind to be artificially made is included in the appropriate arm of the electrical bridge.

In case of filling the inner cavities of the vessels with the liquid with the gas bubbles, the volume of the said bubbles is chosen to be not less than the one of the liquid forced out by the said diaphragm when deflected, under the influence of the maximum possible acceleration (to be more exact, the maxim possible force causing the said acceleration).

In the said pair of the inner cavities of the vessels with the lower points, the said diaphragm is considered to be the multitude of superposed points, under which the heights of the vertical columns of the flowing medium are said to be equal even with tilting (permissible). Therefore, the negative vertical acceleration is not expected to cause any deflection (bowing) of the said diaphragm, and the positive vertical acceleration is expected to cause such deflection (with the tilting position).

In the pair of the inner cavities of the vessels with the upper points, the said diaphragm is considered to be the multitude of the superposed points, over which the heights of the vertical columns of the flowing medium are considered to be equal even with tilting (permissible). Therefore, the positive vertical acceleration is not expected to cause the deflection (bowing) of the said diaphragm, and the negative vertical acceleration is expected to cause such deflection (with the tilting position).

In the initial position, the bridge (electrical) is said to be balanced. Under the influence of the horizontal acceleration $a_\xi$ the capacitances of some superposed (neighboring) arms are expected to increase, and of the other superposed (neighboring) arms are expected to decrease, due to the above the said bridge is said to be balanced.

The transverse accelerations are not said to cause the said diaphragm deflection, since they cause similar pressures on either sides. With $v \neq 0$, there occurs the said diaphragm deflection $11_1$ (herewith, the said diaphragm $11_2$ is not deflected), due to the above, on one side of the latter its capacitance increases, and on the other side—decreases. Herewith, at the output of the electrical bridge (of the differential block) there appears a signal $a_\eta$ sin $v \approx -a_\eta v$, which is used for adjusting the platform in the horizontal position with the help of the said actuating mechanism.

In case of using the liquid with the gas bubbles the said bubbles making the said diaphragm deflection possible, can be created by different ways (chemical reaction, electrical current passing, blowing with gas, and incomplete filling of the said liquid into the vessels).

Thus, with the help of the said pickups 4 and 5 without applying a known accelerometer, there is obtained the output signal of the determiner of the accelerations difference equal to $a_\eta$ sin $v \approx a_\eta v$. The said signal enables the said actuating mechanism to hold, with high accuracy, the said platform in the horizontal plane (conjointly with the said actuating mechanism acting along the perpendicular axis $\zeta$).

Taking the above described into account, it is possible to claim that the principle of the operation of the one-channel device for determining the gravitational vertical under discussion is based on the following:

on determining the difference of the signals of two pickups;

each of which, depending on the sign of the vertical acceleration, works in one of the two modes of determination (determining the apparent acceleration or determining the horizontal acceleration), but simultaneously, the said pickups work in different modes, and bringing (adjusting) this difference up to zero, turning the platform, whereon the vessels of the said pickups are fastened.

Further, consideration is given to obtaining the signal $a_\eta$ sin $v \approx a_\eta v$ with the help of any known accelerometer.

To achieve this purpose, beside the known accelerometer, the authors have invented [3], [4], [5], [6] two more devices (FIGS. 9-17): the device for determining the horizontal acceleration intended for determining the said acceleration both with $a_\eta > 0$ and with $a_\eta < 0$, and also the device for determining the vertical acceleration irrespective of the direction $a_\xi$. The said devices are considered to determine the said accelerations ($a_\xi$ and $a_\eta$), irrespective of the acting of the disturbing factors (vibrations, temperature change, etc.)

Herewith, the said accelerometer and the vessels of the said devices for determining the horizontal and vertical accelerations are fastened on the said platform held in the horizontal position by the said actuating mechanisms.

Each of the said devices for determining $a_\xi$ and $a_\eta$ is considered to contain two pressure sensors. But, herewith, two embodiments have been chosen: each pressure sensor is considered to have its sensing elements (of pressure) and each joint pair of the said pressure sensors has one common sensing element.

Earlier the authors developed [3], [4] method for determining the horizontal accelerations including:

determining pressures difference within the permissible tilting of the said platform in the working position, whereon the horizontal acceleration is implemented, in the points, wherein the pressures caused not only by the positive but also by the negative vertical acceleration are said to be equal, and the pressures caused by the horizontal acceleration are said to be different.

For implementing the said method the device for determining the horizontal acceleration (see, in particular, FIG. 9) is considered to consist of the two sealed rigorously interconnected with each other (rigorously fastened on the said platform) predominantly similar, hollow vessels filled with the flowing medium (the liquid, gas, or their mixture) and the pressure sensors connected with the said vessels (in particular, the two sensors), the outputs whereof are switched in pair to the measuring differential block $6_3$.

The contour of the cross-section of the inner cavity of each vessel ($13_1$ and $13_2$) is located in the accelerations determination plane. In the said contour the choice is made of the upper ($A_3$ and $A_4$) and the lower ($B_3$ and $B_4$) points, they remaining as such (the upper and the lower, correspondingly) within the permissible tilting of the said platform in the working position. The points of pressure determination ($L_3$ and $L_4$) are chosen to be similarly located in the inner cavities of the vessels, i.e. with assumed congruent moving of the inner cavity of one vessel relative to another one till their superposition the said points are said to be superposed as well. Such superposing is possible before mounting (assembling) the said vessels on the said platform with their congruent disposition. At the same time, the said points are chosen similarly located on the parallel straight lines ($A_3B_3$ and $A_4B_4$) in the accelerations determination plane, the former passing through the upper ($A_3$ and $A_4$) and the lower ($B_3$ and $B_4$) points, i.e. at the similar distances from the upper points ($A_3L_3=A_4L_4$)) and at the similar distances from the lower points ($B_3L_3=B_4L_4$). Such disposition of the points of pressure determination is said to prevent any harmful influence of the vertical accelerations (positive and negative, as well as lateral accelerations directed perpendicularly to the accelerations determination plane i.e. at the axis $\zeta$). The contour of the cross-section of the inner cavity of each vessel is made in the accelerations determination plane, the former being asymmetrical relative to the straight line of the said contour passing through the upper and lower points. This asymmetry of the contour means that its extreme points along the horizontal are located at different distances on either side of the said straight line. At the same time, the said contours in the accelerations determination plane are chosen to be counter-oriented one another. This means that the outermost, at the horizontal, the extreme points ($C_5$ and $C_6$) of the said contours are said to be located on either side of the said parallel straight lines. The said asymmetry and counter-orientation of the said contours make them non-congruent (with parallel transfer they are not considered to be superposed, which enables it to determine the horizontal acceleration). The signals from the pressure sensors are supplied to the measuring differential block $6_3$, at the output whereof there is taken the signal of the horizontal acceleration $a_\xi$.

Earlier the authors developed [5], [6] the method for determining the vertical accelerations including:

determining pressures difference within the permissible tilting of the said platform in the working position, whereon the vertical acceleration is implemented, in the points, wherein the pressures caused horizontal acceleration (they being transverse in this case) are said to be equal, and the pressures caused by the vertical acceleration are said to be different.

Figure 10:
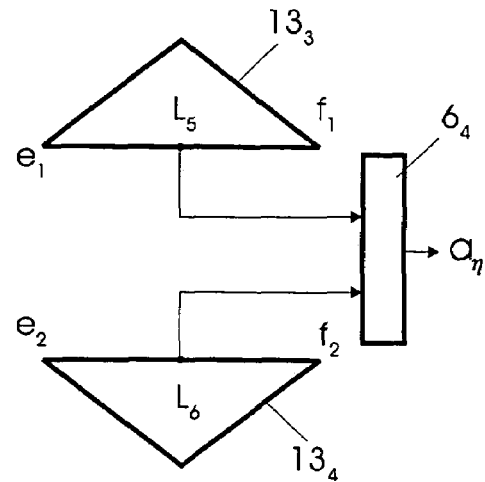
FIG. 10—a scheme of the contours of the cross-sections of the inner cavities of the vessels of the device for determining the vertical acceleration, wherein each pressure sensor having its sensing element.

The said device for determining the vertical acceleration is said constructively to be same as the said device for determining the horizontal acceleration, but its position is perpendicular to the said device for determining horizontal acceleration (see, in particular, FIG. 10). This means that the said parallel straight lines ($e_1f_1$ and $e_2f_2$) belonging to its contours, the lines passing through the outermost points ($e_1f_1$ and $e_2f_2$) along the horizontal are said to be perpendicular to the parallel straight lines ($A_3B_3$ and $A_4B_4$) of the device for determining the horizontal acceleration, the lines passing through the upper ($A_3A_4$) and the lower ($B_3B_4$) points. The said points for determining pressure ($L_5$ and $L_6$) in the said device are also similarly located on the said parallel straight lines, i.e. $e_1L_5=e_2L_6$, $f_1L_5=f_2L_6$. Within the permissible tilting in the working position the outermost horizontally points are also considered to remain as such (the outermost horizontally). The signals of the said pressure pickups are supplied to the measuring differential block $6_4$, from the output whereof there is taken the signal $a_\eta$. In particular, with the horizontal movement from its output (from the measuring differential block $6_4$) there is taken the signal "g" (the free fall acceleration). The said signal, when required, can be nulled.

In the device described above for determining the horizontal acceleration any harmful influence of the vertical acceleration is prevented. In the device described above for determining the vertical acceleration any harmful influence of the horizontal accelerations is prevented. In both these devices there is also prevented any harmful influence of other disturbing factors, in particular, vibrations and temperature, as well as lateral acceleration $a_\zeta$.

However, for the above it is necessary to have the pressure sensors of each jointly used pair with the similar parameters. To select the said sensors is rather difficult. Moreover, an absolute equality of the said parameters is considered to be impossible. Because of the parameters spread of the two pressure sensors of each joint pair there occurs an error. This very error can be decreased to insignificant value (in particular, through nullification). But for that, to prevent also the said error the solution below is provided, where it is said to be principally eliminated.

This goal is achieved by means of replacing in each joint pair of the said pressure sensors the two sensing elements reacting on the pressure, one sensing element of pressure and using artificially made capacitors as the said pressure sensors, the capacitors being and integral parts of the constructions of the devices provided for determining the horizontal and vertical accelerations.

Each of the said devices is also considered to consist (FIGS. 11, 12) of the two sealed, rigorously interconnected (fastened on the said platform), predominantly similar vessels filled with the flowing medium (in particular, with gas, liquid with gas bubbles). The inner cavities of the said vessels together with the said sensing element are said to form capacitors to be used as the pressure sensors. The said pressure sensors (capacitors) are said to be switched to the said measuring differential block (to the measuring differential scheme), it being, in particular, the said electrical bridge.

Figure 11:
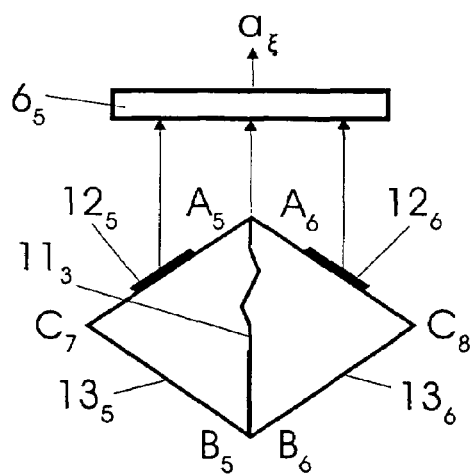
FIG. 11—a scheme of the contours of the cross-sections of the inner cavities of the vessels of the device for determining the horizontal acceleration, wherein the joint pair of the pressure sensors having one common sensing element.
Figure 12:
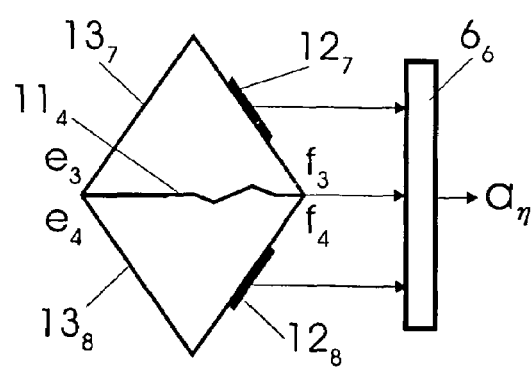
FIG. 12—a scheme of the contours of the cross-sections of the inner cavities of the vessels of the device for determining the vertical acceleration, wherein the joint pair of the pressure sensors having one common sensing element.
Figure 13:
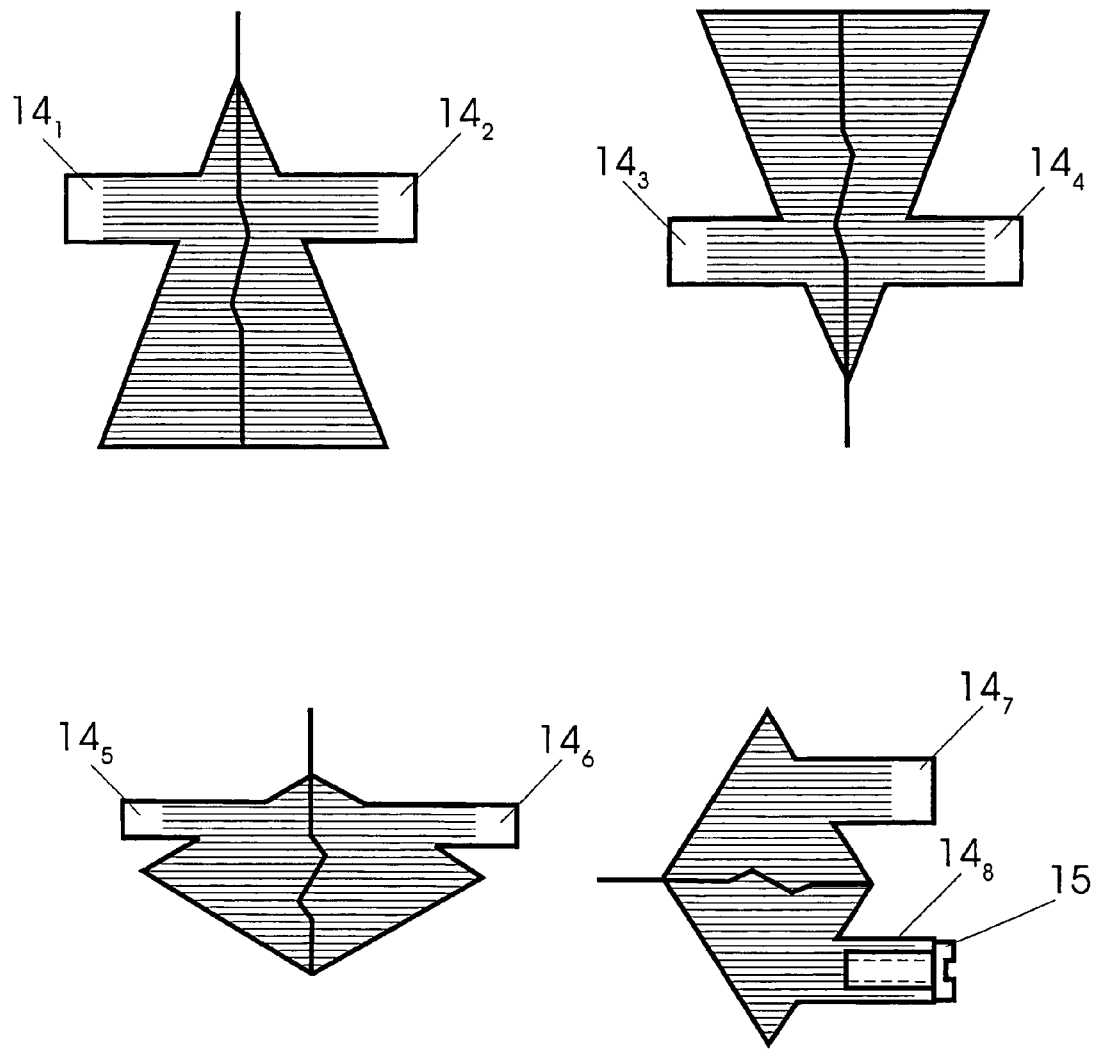
FIG. 13—the contours of the cross-sections of the inner cavities of the vessels with the accumulating chambers.

The said sensing element reacting on the pressures, in particular, the said elastic diaphragm is said to be a common wall (or its part) of the inner cavities of the said vessels. The aggregate of the points of the said sensing element in each contour of the inner cavity of the vessel is marked as $11_3$ and $11_4$ (FIGS. 11, 12).

The contours ($13_5$ and $13_6$, $13_7$ and $13_8$) of the inner cavities of the vessels in the accelerations determination plane are said to be asymmetrical (relative to the said diaphragm, relative to the said aggregates of the said points $11_3$ and $11_4$, to be more exact) and, counter-oriented relative to one another, correspondingly.

All the contours to be used in the present application are said to be located in the plane passing through the mutually perpendicular axes of the said platform. One of the said axes is said to be its vertical axis, and another—chosen, for example, being the parallel, longitudinal (or transverse) axis of the said moving object (in particular, superposed with one of them).

In the device for determining the horizontal acceleration (FIG. 11) the said contour is considered to have the upper and the lower points, which, with the permissible tilting in the working position remain as such (the upper and the lower, correspondingly). The said points are located on the common wall of the said vessels. Herewith, both upper points of both contours are considered, in fact, to be geometrically superposed into one and the lower points of the said contours are considered, in fact, to be geometrically superposed into one.

Under the asymmetry of each contour of the said device we mean the asymmetry relative to the straight line passing through the upper and lower points, i.e. relative to the said common wall of the inner cavities of the said vessels.

The counter-orientation of each pair of the said contours of the cross-section of the inner cavities of the vessels of the said device relative to one another means that the outermost horizontally extreme points ($C_7$ and $C_8$) of the said contours are said to located on either side of the straight line passing through the upper and lower points.

The said asymmetry and counter-orientation of the said contours make them non-congruent (with the parallel transfer they are not superposed), which enables it to determine the horizontal acceleration.

The said sensing element (pressure) of the said device for determining the horizontal acceleration is said to be the aggregate of the multitude of the pairs of the points to be located on either side of the said diaphragm at the similar distances from the upper and lower points. The said points are physically different, since they are acted on by the flowing media of the different vessels. But, geometrically, taking insignificant thickness of the said sensing element into account, the said points can be considered to be superposed into one. The points of each said pair are acted upon along the vertical by the vertical columns of similar height. Therefore, the vertical acceleration is not said to cause any false signal (is not considered to cause the said elastic diaphragm deflection) irrespective of the permissible tilting.

Since the disposition of the said sensing element is similar relative to both inner cavities (in particular, the sensing element is said to divide the said inner cavities of the said vessels into two similar parts), the lateral acceleration (acting perpendicular to the accelerations determination plane) is not considered to cause any false signal, with tilting including.

Using the said differential scheme (in particular, the said electrical bridge) is expected to prevent any influence (in addition among the cross-section accelerations as well as a number of other disturbing factors (vibrations, temperature change, etc.).

The said elastic diaphragm, for example, a membrane, is said to be electrically insulated from the walls of the said vessels. In particular, the said walls can be made from the insulating material (dielectric). On the surface of the said walls of the said cavities application is made of the metallic coatings ($12_5$ and $12_6$, $12_7$ and $12_8$). The said diaphragm and the said metallic coating are considered to be, in this case, the electrodes of the capacitor. Since there are two vessels, there are two capacitors as well. In case it is the said walls of the vessels and the diaphragm the electrodes that serve as the electrodes of the said capacitors, with insulating (electrical) them from each other, they can be chosen to be metallic.

The said capacitors are said to be peculiar pressure sensors, the signals whereof are supplied to the measuring block $6_5$ (in particular, to the said electrical bridge). In the measuring differential block the signal taken from one of the said capacitor is said to be subtracted from the signal taken from another capacitor. But since the capacitances of the capacitors change in terms of the sign in different ways (one capacitance increases, and another one—decreases, correspondingly), the said difference is said to be algebraic. This means that in terms of the value (module) the signals of the horizontal acceleration of both pressure sensors (capacitors) are said to be added. At the same time, the difference of the signals caused by the disturbing factors is said to be equal to zero.

The volume of the gas bubbles in the flowing medium is chosen to be not less than the volume of the said medium to be forced out by the said diaphragm under the influence of the maximum possible acceleration.

When the said horizontal acceleration is absent, at the output of the said measuring differential block the said signal is said to be equal to zero. Under the influence of the said horizontal acceleration (the horizontal inertia force, to be exact) the said elastic diaphragm is said to be deflected, as a consequence thereof, the electrical capacitance of one pressure sensor increases and another one—decreases, and from the output of the said measuring differential block $6_5$ the signal of the horizontal acceleration $a_\xi$ is taken.

The device for determining the vertical acceleration (FIG. 12) is considered to be constructively the same as the device for determining the horizontal acceleration (FIG. 11). The difference between the said devices lies in the different location of the straight lines, whereon the pressure determination points are located. The straight line (FIG. 12) passing through the extreme, the outermost points along the horizontal ($e_3$ and $f_3$, $e_4$ and $f_4$) is said to be perpendicular to the straight line (FIG. 11) passing through the upper ($A_5$ and $A_6$) and the lower ($B_5$ and $B_6$) points. Herewith, with the permissible tilting in the working position, the upper and the lower points are considered to remain as such along the vertical (the upper and the lower), and the extreme, the outermost points are considered to remain as such along the horizontal (the outermost along the horizontal).

In case of using the liquid with the gas bubbles the said bubbles are said to cause insignificant error caused by the change of their concentration in different places of the vessels. This possible error is eliminated by insulating the said bubbles from the said liquid taking part in the influence of the sensing pressure element. Such insulation is based on the creation of the sufficient temperature drop, on account there of, the said gas bubbles are accumulated in the warmest place. The said temperature drop is said to be created, for example, with the help of the winding wound on the said part (in particular, the central part of the inner cavity) by means of passing the current through it. Moreover, for complete insulation of the said gas bubbles in each of the inner cavities provision is made for the miniature accumulating chamber (FIG. 13), on the gas part whereof ($14_1$-$14_8$) there is wound a winding with passing the current through it (the said windings are not shown in FIG. 13). Due to the above, the said gas is expected to be accumulated in the said gas parts of the said accumulating chambers, those being the warmest parts). That is explained by the fact that every gas bubble is acted upon by the two anti-oriented forces: the force F caused by the temperature drop and buoyancy force $F_p$. With slight but sufficient temperature drop F>$F_p$ there occurs travel of the gas bubbles to the warmest place (the gas part of the accumulating chamber). The volume of the said gas part is chosen to be not less than the maximum possible volume of the liquid to be forced out by the said diaphragm under the influence of the maximum possible acceleration.

Like in any other measuring device, in the said device for determining the vertical it is necessary to have the calibration of zero of the output signal in the initial (in particular, stationary) state. For the above, in particular, each vessel is provided with the screw (see, for example, 15 in FIG. 13) with the thread in the wall of the vessel, and the part of the body whereof is placed in the inner cavity of the said vessel (in particular, the accumulating chamber). While screwing the said screw into the cavity, the pressure in the latter increases and the volume of the gas bubbles (gas) decreases.

When applying a piezoelectric element as the sensing element of pressure of the piezoelectric, the latter is said to give off the signal of the acceleration derivative. Herewith, no power supply is required. In this case, the acceleration can be obtained through integrating the signal of the said derivative.

The application of the devices, wherein each corresponding pair of insulated from each other sealed vessels (two-vessel devices) with one sensing element requires having gas bubbles (gas), which makes the said construction more complicated.

Therefore, the authors have chosen the technical solution consisting in replacing each such pair by one sealed vessel (a one vessel device), and, naturally, with one sensing element.

Figure 14:
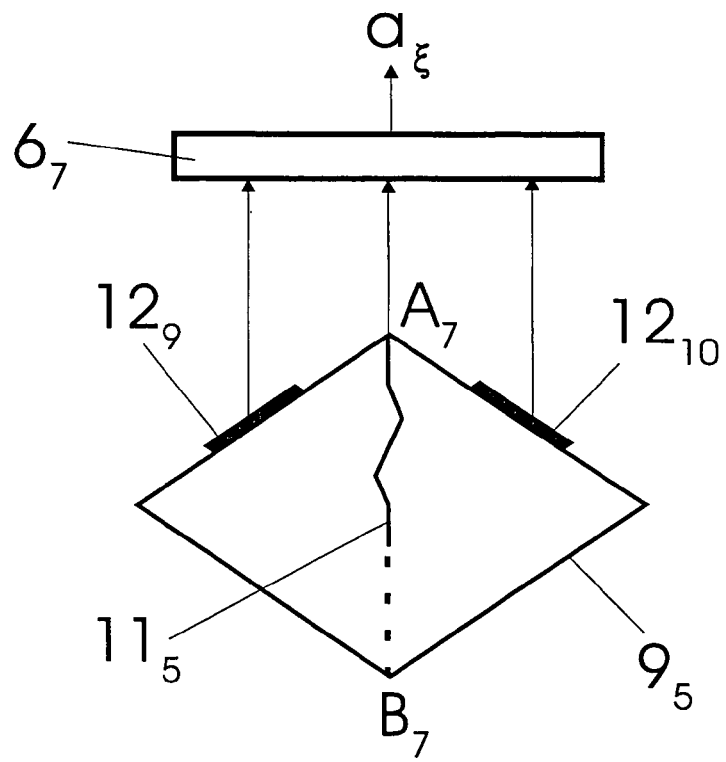
FIGS. 14, 15, 16—the schemes of the contours of the cross-sections of the inner cavities of the one-vessel devices.

In FIG. 14 there is shown a scheme of one-channel device for determining the horizontal acceleration with the contour $9_5$ of the cross-section of the inner cavity of the vessel having the upper point $A_7$ and the lower point $B_7$.

Figure 15:
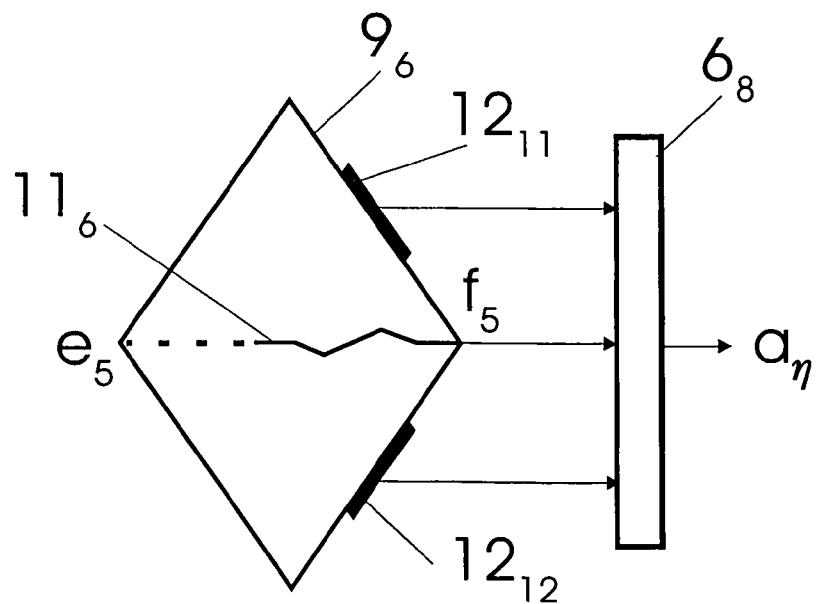

In FIG. 15 there is shown a scheme of one-channel device for determining the vertical acceleration with the contour $9_6$ of the cross-section of the inner cavity of the vessel having its extreme points $e_5$ and $f_5$.

Figure 16:
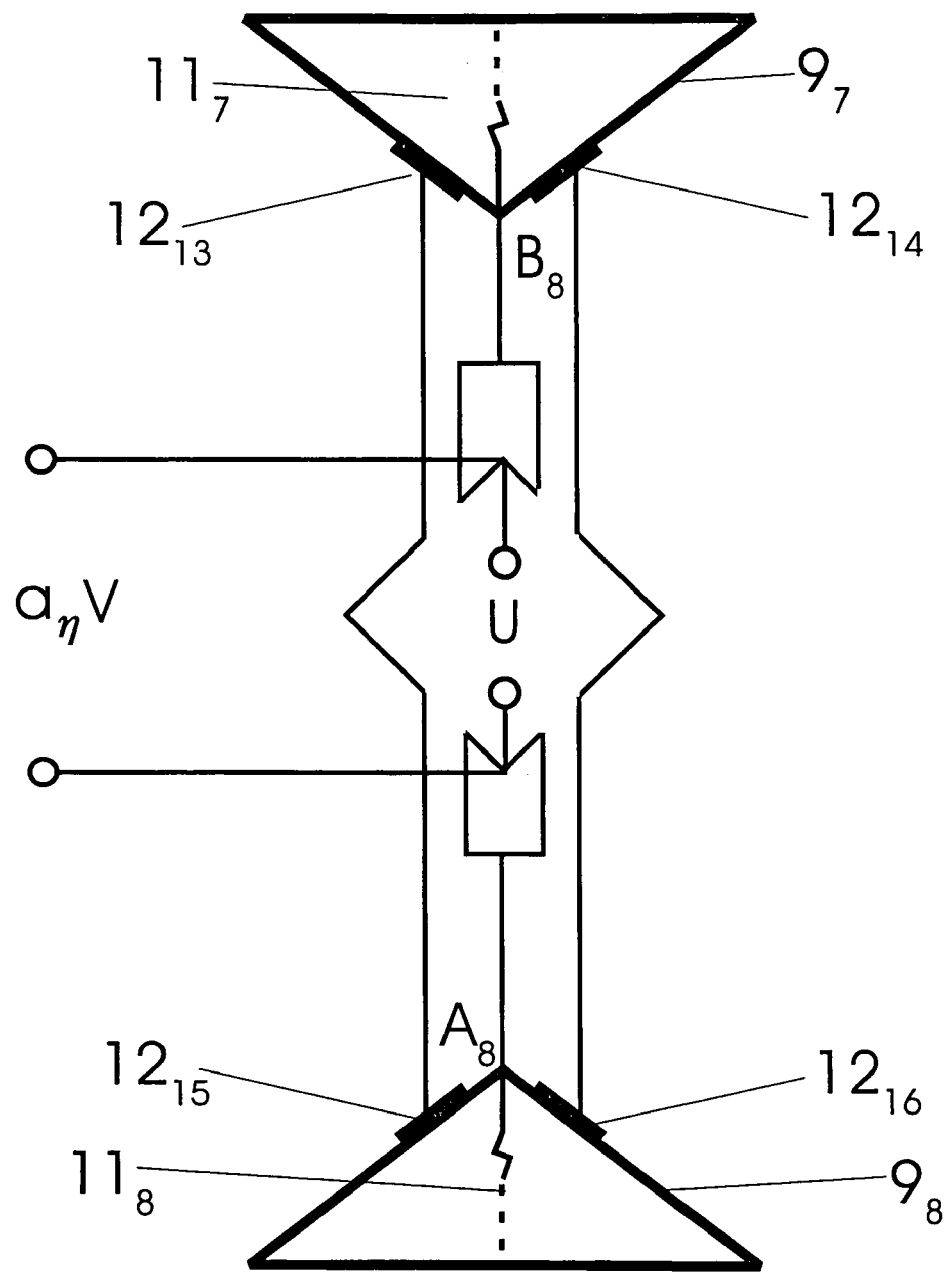

In FIG. 16 there is shown a scheme of the bipolar determiner of the accelerations difference with the contours of the cross-sections of the inner cavities of the said one-channel devices: the contour $9_7$ with the lower point $B_8$ and the contour $9_8$ with the upper point $A_8$.

In the said one-vessel device instead of the common wall of the two insulated one from another vessels there is provided an elastic diaphragm with holes (in FIGS. 14-16 the said holes are shown by means of a dotted line).

Herewith, in the contour of the cross-section of each inner cavity there are the same characteristic points, accordingly, (the upper, lower, extreme) as in the said two-vessel devices.

In FIGS. 14-16 the corresponding elastic diaphragm ($11_5$, $11_6$, $11_7$, $11_8$), the corresponding electrodes (the vessel walls) $12_9$ and $12_{10}$, $12_{11}$ and $12_{12}$, $12_{13}$ and $12_{14}$, $12_{15}$ and $12_{16}$ are said to be switched to the differential block: $6_7$, $6_8$ and in FIG. 16, by way of example, are said to be included into the electrical bridge.

The negative vertical acceleration in the contour $9_7$, the positive vertical acceleration in the contour $9_8$, the positive and negative vertical accelerations in the $9_5$ are not considered to cause any deflection of the diaphragm even in the tilting position, since it is located on the part of the straight line passing through the characteristic points (the upper $A_7$ and the lower $B_7$, the lower $B_8$ and the upper $A_8$, correspondingly).

The horizontal acceleration in the contours $9_5$, $9_7$, $9_8$ are said to cause the bowing of the corresponding elastic part of the said diaphragm ($11_5$, $11_7$, $11_8$), since the volume of the flowing medium in each vessel is not considered to change herewith, and it means that in these cases the said flowing medium does not prevent from deflection. In particular, it is owing to the said reason that in the tilting position the positive vertical acceleration in the contour $9_8$ is said to cause the deflection of the elastic part of the said diaphragm.

Similar things take place in the said one-channel device for determining the vertical acceleration (FIG. 15), but the horizontal acceleration is not considered to cause the deflection of the said elastic diaphragm therein, even in the tilting position, and, on the contrary, the vertical acceleration is considered to cause the said deflection. This is explained by the fact that the aggregate of the points of the elastic diaphragm $11_6$ is said to be located on the part of the straight line passing through the extreme points ($e_5$ and $f_5$) being the outermost along the horizontal.

It should be taken into account that the disturbing factors acting similarly (for example, temperature changes) on the said diaphragm of any vessel on either side are not considered to cause its deflection.

Figure 17:
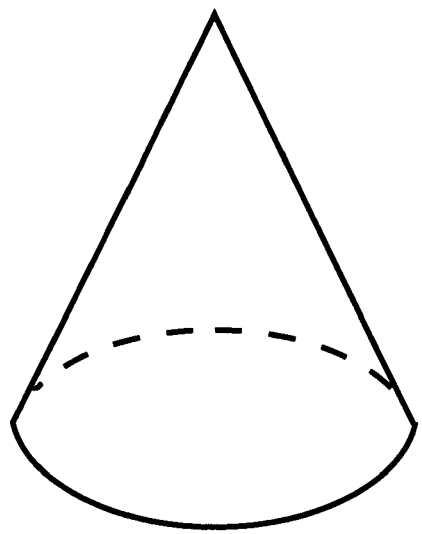
FIG. 17—one of the possible inner cavities of one-vessel device for determining the horizontal and vertical accelerations.

The form of the inner cavity of the one-vessel device can be different. One of the possible forms of that kind is shown in FIG. 17 in the shape of a round straight cone. The top of the said cone can used as the characteristic point (the lower, upper, extreme), however, one should keep in mind that there exist the most optimal forms of the cross-sections of the inner cavities of the vessels provided by the devices in the present application.

At present, use is widely made of the accelerometers, in particular, those, wherein the flowing medium is used as an inertial body. An accelerometer is known to measure the apparent acceleration. So, the authors have solved the task of receiving the signal $a_n$ sin $v \approx a_n v$ (supplied to the actuating mechanism) with the help of any known accelerometer (FIG. 18).

Figure 18:
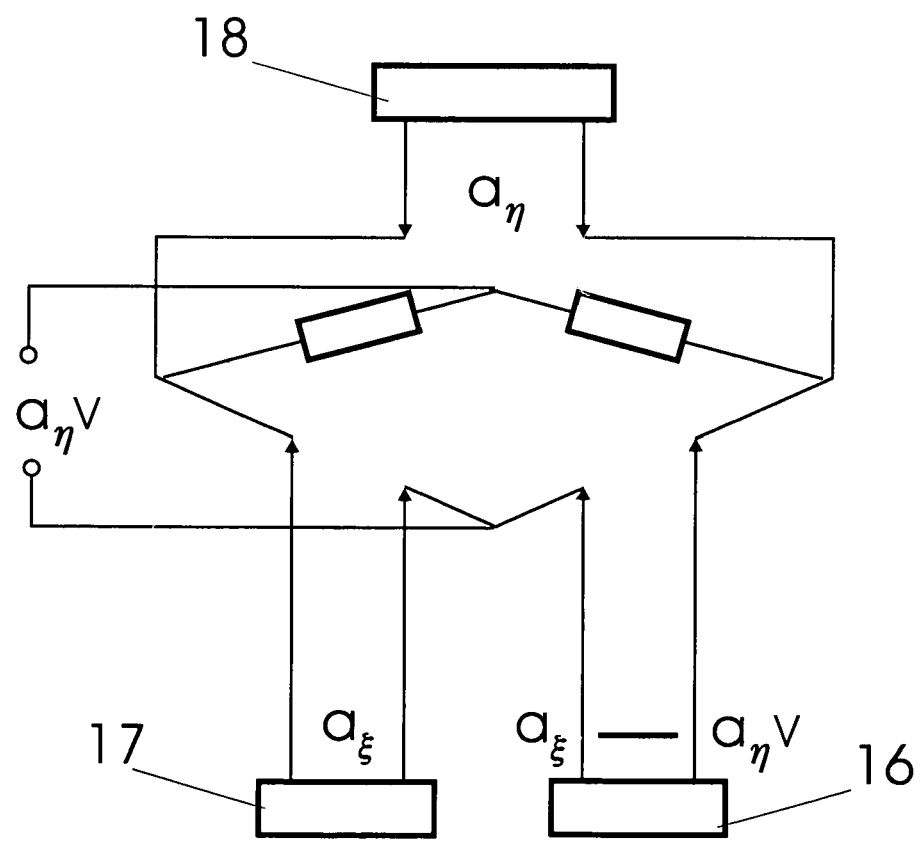
FIG. 18—a scheme of the bipolar determiner of the accelerations difference with the accelerometer.

In FIG. 18 there is shown a scheme of the said bipolar determiner of the accelerations difference (BDAD) with applying any known accelerometer. The said bipolar determiner of the accelerations difference is said to consist of the accelerometer 16, the device for determining the horizontal acceleration 17, and the device for determining the vertical acceleration 18 (the vessels whereof are located on one and the same platform 3) which are included into the electrical bridge. The sensitivity axis of the said accelerometer and the contours of the cross-sections of the inner cavities of the vessels used (wherein the said accelerations are measured) are chosen to be located in one plane or in the parallel plane (the acceleration determination plane). The said accelerometer 16 and the said device for determining the horizontal acceleration 17 are said to be included into the neighboring arms of the said electrical bridge, and in its other neighboring arms there are included electrical elements with the electrical parameters, in particular, to be determined by the output values of the said accelerometer and the said device for determining the horizontal acceleration with the initial balanced state of the said bridge. Since the stabilization of the said platform 3 is performed with a very high accuracy, the said accelerometer produces the signal of the apparent acceleration with ($a_\eta>0$)

$$a_{\kappa\xi}=a_\eta \cos v - a_\eta \sin v \approx a_\xi - a_\eta v,$$

and with $a_\eta<0$ there is produced the opposite signal of the member to be subtracted, i.e.

$$a_{\kappa\xi}=a_\xi \cos v + a_\eta \sin v \approx a_\xi + a_\eta v,$$

At the same time, both with $a_\eta>0$ and with $a_\eta<0$ the device for determining the horizontal acceleration produces the signal $a_\xi$ independent on the sign $a_\eta$. Therefore, in case the electrical voltage provided to the input diagonal of the bridge is left unchanged in terms of the sign (with applying the direct current) or in terms of the phase (when applying the alternating current), then with $a_\eta>0$ from the output diagonal of the said bridge there is taken the signal $$a_{\kappa\xi}-a_\xi=a_\xi-a_\eta v-a_\xi=-a_\eta v$$

By means of the said signal the said actuating mechanism is said to adjust the said platform in the direction of the horizontal position, i.e. in the right direction. At the same time, with $a_\eta<0$ in this case from the output diagonal of the said electrical bridge there would be taken the signal $$a_{\kappa\xi}-a_\xi=a_\xi+a_\eta v-a_\xi=+a_\eta v.$$

It is seen in this case that adjusting the said platform would take place not in the direction of the horizontal position but from the latter, which is considered to be impossible. Therefore the signal $a_\eta$ (from the device for determining the vertical acceleration) is supplied to the input diagonal of the said bridge (FIG. 18).

With such feeding voltage of the said bridge in case $a_\eta>0$ we have $$a_{\kappa\xi}-a_\xi=a_\xi-a_\eta v-a_\xi=-a_\eta v,$$

and with $a_\eta<0$, due to the polarities change (the signs or the phases, correspondingly) of the signals of the said feeding voltage and the said accelerations for the opposite, we have $$-(a_{\kappa\xi}-a_\xi)=-(a_\xi+a_\eta v-a_\xi)=-a_\xi-a_\eta v+a_\xi=-a_\eta v$$

Thus, feeding the said signal $a_\eta$ to the input diagonal of the said bridge is said to provide the right direction of adjusting the said platform, both with $a_\eta>0$ and with $a_\eta<0$.

For preventing any harmful influence of the vibrations, temperature drop, centripetal and Coriolis accelerations the said vessels have been chosen to be compactly located, with similar disposition of the joint pairs (vessels) in the parts of the moving object with similar vibrations and temperature.

The OChGVDD (one-channel gravitational vertical determination devices) described above enable one to solve the problem of the said platform stabilization in the horizontal plane with rather high accuracy, considered to be unlimited by any principal obstacles, and preventing any significant drawbacks and disadvantages inherent to the prior art, in particular, GSB (gyro stabilization platform).

Such stabilization can be implemented by means with the gyroscope and even without the latter by means of the provided TChGVDD) (two-channel device for determining gravitational vertical).

The TChGVDD can be double-axis and multi-axis, with the said gyroscope and without the latter.

The simplest double-axis scheme of the said TChGVDD without the said gyroscope is shown in FIG. 19.

The TChGVDD provided is considered to consist of two frames: the said object (external) $3_{11}$ and additional (internal) $3_{12}$, at the axes 19 and 20 of rotation whereof there are located two OChVDD ($21_1$ and $21_2$). The one-channel device for the gravitational vertical determination $21_1$ is said to contain the said actuating mechanism $2_{11}$ and the said bipolar determiner of the accelerations difference $1_{11}$, and the said one-channel device for the gravitational vertical $21_2$ is said to contain the said actuating mechanism $2_{12}$ and the said bipolar determiner of the accelerations difference $1_{12}$. The body of the said actuating mechanism $2_{11}$ is rigorously fastened on the body of the said moving object (shown by the dotted line), and the body of the said actuating mechanism $2_{12}$ is rigorously fastened on the said object frame $3_{11}$. The said frame $3_{11}$ as well as the said base (foundation) of the said bipolar determiner of the accelerations difference $1_{11}$ (the base whereon the said vessels of the said determiner are fastened) are rigorously fastened on the said axis (shaft) 19 of the said actuating mechanism $2_{11}$. The said frame $3_{12}$ as well as the said base (foundation) of the said bipolar determiner of the accelerations difference $1_{12}$ (the base, whereon the said vessels of the said determiner are fastened) are rigorously fastened on the said axis (shaft) 20 of the said actuating mechanism $2_{12}$. The role of the stabilization (in the horizontal plane) platform in FIG. 19 is played by either the said frames $3_{11}$ and $3_{12}$ (the said foundations of the said bipolar determiners of the accelerations difference $1_{11}$ and $1_{12}$) or the said frame $3_{12}$ alone.

Let's consider the operation, by way of example, of the said double-axis device for determining the gravitational vertical (through stabilizing the said platform in the horizontal to be shown in FIG. 19.

Let in the initial position the said frame $3_{11}$ and $3_{12}$ be horizontal and the movement takes place in the direction of the said axis $\xi$. If herewith, the tilting of the said moving object relative to the said axis $\zeta$ (around the latter) takes place, i.e. by the pitch angle, then in the said case, from the said bipolar determiner of the accelerations difference $1_{11}$ to the said actuating mechanism $2_{11}$ there is provided the corresponding signal, as a consequence thereof, the said mechanism by means of turning the said frame $3_{11}$ in the opposite direction is expected to hold the said frame in the horizontal position (in the horizontal plane).

If there is a case when from the initial horizontal position of the said frames $3_{11}$ and $3_{12}$ the said tilting takes place relative to (around) the said axis $\xi$, i.e. by the aileron angle, then from the said bipolar determiner of the accelerations difference $1_{12}$ to the said actuating mechanism $2_{12}$ there is provided the corresponding signal, as a consequence thereof, the said mechanism by tilting the said frame $3_{12}$ in the opposite direction is considered to hold the latter in the horizontal position (in the horizontal plane). If there is a case when the said tilting takes place relative to (around) the directions tilted (inclined) to the said axes $\xi$ and $\zeta$, then there might occur an error of the stabilization, the one being of the geometrical character and being called gimbal (when returning to the initial position it is considered to completely disappear). With the small tilting angle, in this case, around one of the said axes ($\xi$ or $\zeta$) at least, the said gimbal error is considered to be insignificant and it can be ignored with the higher accuracy [7], [8]. For example, the said take place with climbing and reducing the altitude of the flight with the small aileron of the aircraft. Increasing the number of the said intermediate frames with the location of the said OChGVDD (one-channel device for determining the gravitational vertical) at the said axis (shaft) of each of the said frames, it is possible to achieve not only increasing the accuracy of the stabilization but also, practically, complete insulation of the said platform (the inner frame) from potential evolutions of the moving object. It can be accounted for the fact that the adjustment of each frame is said to take place (unlike the prior art, in particular, the said gyro stabilized platform) not by the tilting angle of one frame relative to another one, but by the angle of non-horizontality of each frame (i.e. by the tilting angle of the said frame relative to the horizontal plane). With the introduction of each intermediate frame, its axis (shaft) of the rotation is considered to be simultaneously the said axis (shaft) of the said actuating mechanism of the said one-channel device for determining the gravitational vertical, and the body of the said mechanism is rigorously fastened on the proceeding frame, the rotation axis (shaft) whereof is said to be perpendicular to the rotation axis (shaft) of the said newly introduced intermediate frame.

Thus, the operation of the provided device for determining the gravitational vertical in each channel (without using the known accelerometer) is as follows:

determining the pressure in the particular points, supplying the signals of the said pressures to the measuring differential blocks (measuring differential schemes), supplying the said accelerations signals of the measuring differential blocks (measuring differential scheme) to the said determining differential block (to the determining differential scheme), supplying the signal from the output of the determining differential block (the signal of difference of apparent and horizontal accelerations) to the said actuating mechanism, adjusting (in the accelerations determination plane) the said signal up to zero by means of tilting the said platform (the base) to be stabilized.

With applying the known accelerometer, the signal of the latter is also supplied to the determining differential block (determining differential scheme)

It should be taken into account that in the process of determining the gravitational vertical, irrespective of the disturbing factors, with the higher accuracy determination is made of the horizontal, vertical and apparent accelerations, and by the angle of the rotation of the output shaft of the said actuating mechanism, the tilting angle of the object (in particular, the aileron angle or (and) the pitch angle).

The present technical solution compared to the prior art is said to have, irrespective of the disturbing factors, principal distinguishing features:

determination is made of the gravitational vertical, since any harmful influence of the centripetal acceleration is prevented, the one caused by the Earth rotation;

determination is made of the gravitational vertical with the help of determining the acceleration alone and their difference, and also bringing the said difference up to zero;

in case of the negative vertical acceleration the change is automatically made of the polarity of the apparent and horizontal accelerations signals (i.e. their phases or signs) for the opposite;

the presence of the said bipolar determiner (two embodiments) determining the difference of the said apparent and the horizontal accelerations, irrespective of the sign of the vertical acceleration;

use is made of the body of the moving object as the platform stabilized in the horizontal plane;

use is made of the two pickups (the lower and the upper) one, correspondingly) working simultaneously in different determination modes (in the mode of determining the apparent acceleration and in the mode of determining the horizontal acceleration), but each of them is said to work herewith, depending on the sign of the vertical acceleration, in one of the said modes;

the position of the vessels on the said shaft of the said actuating mechanism;

the position of the said accelerometer on the said shaft;

the planes of the accelerations determination (the horizontal, vertical and apparent ones, correspondingly) are said to be parallel, in particular, superposed into one;

the opportunity of different position of the said actuating mechanism (on the body of the moving object, on the frames of the suspension);

the presence of the inner cavities of the vessels with the lower points, they remaining as such (the lower) with the permissible tilting in the working position;

the connection between the integral parts of the device for determining the gravitational vertical;

a new aggregate of the significant features.

The present technical solution compared with the prior art is said to have the following remarkable advantages:

the opportunity (unlike the prior art) of applying the sensitivity threshold, practically equal to zero is considered to obtain rather high accuracy unavailable by the prior art (there are no principal obstacles for achieving such an accuracy);

universality (an opportunity of applying not only in the horizontal but also in the tilting position, as well as in the upside down position; both with the positive and with the negative vertical accelerations; both with applying the said gyroscope and without the latter; an opportunity of applying the body of the moving object as the said platform to be highly accurate and stabilized in the horizontal position);

quick readiness for the operation (unlike the said gyro stabilized platform no long-lasing initial orientation is required);

leveling the platform (bringing it into the horizontal position) is implemented by the signal $a_n \sin v \approx a_n v$, as a consequence thereof, unlike the prior art the vertical acceleration is not only considered to make any harmful influence on the said vertical determination but, on the contrary, is considered to increase the accuracy of the said determination;

the opportunity of applying any known accelerometer not only with the positive but also with the negative vertical accelerations;

the said disturbing factors (accelerations, vibrations, temperature changes and etc.) are not expected to make any harmful influence on the said vertical determination, i.e. the present technical solution is considered to be undisturbed not only in relation to the horizontal translatory accelerations but, unlike the said gyro stabilized platform, also to the other accelerations (centripetal, Coriolis, vertical) as well as relating to the other disturbances (vibrations, temperature changes, etc.);

the present technical solution is considered to have no significant drawbacks inherent to the said gyro stabilized platform, and to the latest analogue (prototype as well (to be developed earlier by the authors), the drawbacks described previously in the present application;

unlike the prior art, the present invention is said to determine the gravitational vertical on the moving object caused by the gravitational force, since in practice any harmful influence of the centripetal and Coriolis accelerations caused by the Earth rotation and the said moving object movement is eliminated;

it is not required to observe the Shuler's non-disturbance condition;

the present technical solution is considered to be much simpler, lighter, cheaper, more compact and more efficient compared to the known gyro stabilized platform.

Therefore, the present technical solution can be used not only for determining the vertical with incredibly high accuracy but also for other objects, in particular:

creating far more accurate and more efficient systems of autonomous navigation and piloting with self-maintained application during unlimited time, and devoid of significant drawbacks and disadvantages of the prior art;

an effective application in the systems of aircrafts landing;

the application for the accurate determination of the vertical in the mobile arrangements during the constructions works, during the topographical survey;

the stabilization of different objects (aerials, weapons, photo cameras, optic equipment and etc.) with the higher accuracy in the horizontal position, they being located on the moving vehicles, in particular, transportation ones;

the determination of the vertical velocity and the flight altitude, (in the airless space, including);

the accurate determinations of the horizontal and the vertical accelerations by means of the devices for determining the accelerations fastened even on the body of the moving object. In this case, while tilting changes are made of the columns lengths of the flowing medium, acting on the pressure pickups under the influence of the accelerations to be determined. With the small tilting angles (for which with higher accuracy one can assume cos v≈1, sin v≈v) the said changes can be ignored, with considerably high accuracy. Moreover, the investigations of the authors show that with the permissible tilting (degrees and even tens of degrees) there exist the most optimal forms (shapes) of the vessels to be used and the positions of the points of the pressure determination, wherewith the said changes can also be ignored with high accuracy;

the opportunity of the autonomous determination of the location of the moving object without necessity of applying the said gyroscopes being the main source of the errors in the inertial navigation systems.

NOTES

1. For especially accurate determination of the vertical the known accelerometers for determining accelerations are unacceptable (because of the action (influence) of the said disturbing factors).

Therefore, the authors have found new, especially accurate solutions for determining the said accelerations. The solutions provided are considered to the integral parts of the technical solution for determining the vertical. Therefore, the present application for the invention relates to the group of the technical solutions united by common inventive concept (determining the vertical).

2. In case of necessity a direct current can be transformed into an alternating one and vice versa.

3. For amplifying the signals use can be made of the amplifiers.

4. Our request is to name our intentions to be proposed by us as below: "Naumov, the method for determining the vertical", "Naumov, the device for determining the vertical".

5. On account of the old age of Mr. M. Naumov (born in 1926) we are asking you to reduce the terms of the expertise of the patent application for the invention proposed.

We claim:

1. A method for determining a vertical on moving object including in one of the two channels, at least, the following steps:
   determining an apparent acceleration in a plane to be chosen, it passing through mutually perpendicular axes of a platform, whereon accelerations being determined, one of which being a vertical axis and another being a chosen axis, for example, parallel longitudinal axis of the moving object, in particular, being superposed with the said longitudinal axis,
   determining one of the accelerations in the said chosen plane, for example, horizontal acceleration being a part of the said apparent acceleration,
   determining the difference of the said accelerations, in particular, the said apparent acceleration and the said horizontal acceleration,
   changing the polarities of the said accelerations in the case of changing the polarity of another acceleration, in particular, vertical acceleration one being also part of the said apparent acceleration,
   determining a gravitational vertical by the said difference, in particular, by means of bringing the said difference up to zero.

2. The method as set forth in claim 1, wherein bringing the said difference up to zero being implemented by turning the said platform, according a position whereof the gravitational vertical being determined.

3. The method as set forth in claim 1, wherein determining the horizontal acceleration being implemented according to the pressures difference, they being determined in the points, wherein even with the permissible tilting of the said platform, the pressures caused by transverse cross-axis accelerations, including the vertical acceleration are equal, and those created by the horizontal acceleration are different.

4. The method as set forth in claim 1, wherein determining the vertical acceleration being implemented according to the pressures difference determined in the points, wherein even with the permissible tilting of the said platform the pressures caused by the horizontal accelerations are equal, and those caused by the vertical acceleration are different.

5. A device for determining a vertical on a moving object comprising in one channel mutually connected:
   bipolar determiner,
   actuating mechanism connected to the said bipolar determiner, and
   platform, whereon the vessels of said bipolar determiner being fastened, being connected with the actuating mechanism, and by position whereof determination of a vertical being made.

6. The device as set forth in claim 5, made to be located on each of the axes of the frames of the gimbal suspension.

7. The device as set forth in claim 5, wherein as the actuating mechanism use being made of an electrical mechanism, fastened, in particular, on the body of the moving object, the axis whereof being connected with the axis of the said platform.

8. The device as set forth in claim 5, wherein as the actuating mechanism use being made of an autopilot connected to the said bipolar determiner, fastened on the body of the moving object, in particular, a flying vehicle.

9. The device as set forth in claim 5, wherein as the actuating mechanism use being made of an erection motor, fastened on the axis of the chosen frame of the suspension of the gyroscope.

10. The device as set forth in claim 5, wherein the said bipolar determiner comprising mutually connected:

two pairs of sealed, predominantly similar hollow vessels filled with flowing medium, in particular, liquid, they located on the said platform and provided with pressure sensors, in particular, with elastic diaphragms, two differential blocks, to which the pressure sensors being electrically connected, a differential scheme, to which the differential blocks being electrically connected.

11. The device as set forth in claim 10, wherein in each from the asymmetrical counter-oriented at the axis chosen, particularly, at the horizontal contours of the cross-sections of the inner cavities of the said vessels of one pair a point being used, it being the outermost at a perpendicular to an axis chosen, in particular, a vertical axis of the said platform, and in each of the asymmetrical counter-oriented contours of the cross-sections of the inner cavities of the said vessels of another pair an another point being used, it being the outermost in the opposite direction.

12. The device as set forth in claim 11, wherein the points of determining the pressures of the pressure sensors connected with the vessels having been used similarly located in the inner cavities of the vessels on parallel straight lines, in particular, superposed into one straight line, containing the said outermost points, in particular, in one pair of the vessels containing lower points, and in another pair containing upper points.

13. The device as set forth in claim 12, wherein the contour of the cross-section of the inner cavity of each vessel being used asymmetrical relating to the said straight line of the said contour, the line containing the said outermost point.

14. The device as set forth in claim 13, wherein the said counter-orientation of the asymmetrical contours of the cross-sections of the inner cavities of the vessels being implemented by the location of the said outermost points of the said contours on either side of the said parallel straight lines, in particular, superposed into one straight line.

15. The device as set forth in claim 14, wherein the said contours being located in the plane passing through the mutually perpendicular axes of the said platform, one of which being its vertical axis, in particular, passing through the straight lines of the said platform, they being parallel to the said axes.

16. The device as set forth in claim 15, wherein each vessel provided with screw with thread in the wall of the vessel, and the body of the said screw being partly put in the inner cavity of the vessel.

17. The device as set forth in claim 5, wherein the said bipolar determiner comprising mutually connected accelerometer, device for determining vertical acceleration and device for determining the said horizontal accelerations acceleration included into an electrical bridge.

18. The device as set forth in claim 17, wherein into the input diagonal of the electrical bridge the device for determining one of the accelerations being a part of the apparent acceleration, in particular, the vertical acceleration, being included, in its output diagonal the actuating mechanism being included, into the neighboring arms of the said bridge the accelerometer and a device for determining another from the accelerations being part of the apparent acceleration, in particular, the horizontal acceleration, being included.

* * * * *